US012606377B2

(12) United States Patent
Gorman

(10) Patent No.: US 12,606,377 B2
(45) Date of Patent: Apr. 21, 2026

(54) MERRY-GO-ROUND STORAGE CONVEYOR SYSTEM

(71) Applicant: Team Conveyer Royalty A LLC, Del Mar, CA (US)

(72) Inventor: John G. Gorman, Del Mar, CA (US)

(73) Assignee: Team Conveyer Royalty A LLC, Del Mar, CA (US)

( * ) Notice: Subject to any disclaimer, the term of this patent is extended or adjusted under 35 U.S.C. 154(b) by 471 days.

(21) Appl. No.: 18/124,882

(22) Filed: Mar. 22, 2023

(65) Prior Publication Data

US 2023/0331487 A1 Oct. 19, 2023

Related U.S. Application Data

(60) Provisional application No. 63/330,458, filed on Apr. 13, 2022.

(51) Int. Cl.
B65G 1/137 (2006.01)
B65G 1/04 (2006.01)
(Continued)

(52) U.S. Cl.
CPC ......... B65G 1/1376 (2013.01); B65G 1/0485 (2013.01); B65G 1/1371 (2013.01);
(Continued)

(58) Field of Classification Search
CPC .. B65G 1/0485; B65G 1/1371; B65G 11/023; B65G 2203/0216; B65G 1/045;
(Continued)

(56) References Cited

U.S. PATENT DOCUMENTS 6,357,983 B1 3/2002 Junca
8,517,169 B2 * 8/2013 Kirkbride ............... B07B 11/06
198/771

(Continued)

FOREIGN PATENT DOCUMENTS

CN 107150875 A 9/2017

OTHER PUBLICATIONS

ISR and Written Opinion for related PCT/US23/15902 dated Jun. 28, 2023, 10 pages.
(Continued)

*Primary Examiner* — Thomas Randazzo
(74) *Attorney, Agent, or Firm* — Procopio, Cory, Hargreaves & Savitch LLP

(57) ABSTRACT

Conventional automated fulfillment systems require complex technology, such as robots and autonomous guided vehicles. Accordingly, embodiments are disclosed for a conveyor system that can perform automated fulfillment with the simplicity of conveyor technologies. The conveyor system may comprise a plurality of concentric, circular, nested conveyors or parallel linear conveyors that each comprises a plurality of segments. The conveyor system may also comprise a chute along a radial or orthogonal axis. Each conveyor is configured to move, such that each segment of the conveyor is movable into the chute. A chute mechanism may be configured to move items in and/or out of a chute. Thus, for example, a control system may move items, stowed on the conveyors, into the chute, and utilize the chute mechanism to move all of these items out of the chute and off of the conveyor system with a single sweep operation.

21 Claims, 14 Drawing Sheets

(51) Int. Cl.
| | | |
|---|---|---|
| *B65G 11/02* | (2006.01) | |
| *B65G 29/00* | (2006.01) | |
| *G06Q 10/087* | (2023.01) | |

(52) U.S. Cl.
CPC ........... *B65G 29/00* (2013.01); *G06Q 10/087* (2013.01); *B65G 11/023* (2013.01); *B65G 2203/0216* (2013.01)

(58) Field of Classification Search
CPC ...... B65G 29/00; B65G 29/02; B65G 47/846; G06Q 10/087
See application file for complete search history.

(56) References Cited

U.S. PATENT DOCUMENTS

| | | | | |
|---|---|---|---|---|
| 11,754,576 B2 * | 9/2023 | Gorman | ................ | B01L 3/5085 |
| | | | | 700/266 |
| 2011/0005896 A1 | 1/2011 | Kirkbride et al. | | |
| 2014/0244026 A1 | 8/2014 | Neiser | | |
| 2020/0110103 A1 | 4/2020 | Gorman | | |
| 2020/0324974 A1 * | 10/2020 | Gorman | ............... | B65G 11/023 |

OTHER PUBLICATIONS

Partial Search Report mailed Mar. 3, 2026 for European Application No. 23788736.9, 15 pages.

* cited by examiner

400

100A        100B              100C

440A

440B

440N

100N

400

100A

100B

100G

100D

100F

440D

100N

Y

Z ──► X

MERRY-GO-ROUND STORAGE CONVEYOR SYSTEM

CROSS-REFERENCE TO RELATED APPLICATIONS

This application claims priority to U.S. Provisional Patent Application No. 63/330,458, filed on Apr. 13, 2022, which is hereby incorporated herein by reference as if set forth in full. In addition, this application is related to U.S. patent application Ser. No. 16/578,108, filed on Sep. 20, 2019, and U.S. patent application Ser. No. 16/828,863, filed on Mar. 24, 2020, which are both hereby incorporated herein by reference as if set forth in full.

BACKGROUND

Field of the Invention

The embodiments described herein are generally directed to automation, and, more particularly, to the coordination of a plurality of conveyors within an automated system.

Description of the Related Art

Civilization has used the same basic method of storing goods from the Stone Age to modern times: carry, stow, pick, and carry (CSPC). This storage method has persisted because of the extraordinary versatility of human locomotion. Human arms with their cooperating prehensile hands, remarkable haptic sensing, and visual coordination, managed by a purposeful intelligent processor, the human brain, makes CSPC efficient.

Refrigerators, freezers, cupboards, lockers, drawers, and closets are common examples of CSPC systems, and represent subsets of the storage systems in every household. In small stores, supermarkets, pickup centers, and large fulfillment centers, the process is the same, but at varying scales. CSPC systems scale from clinical laboratory testing, in which samples, reagents, and reaction vessels are stowed and manually or automatically picked, to household storage, retail shops, and supermarket, to warehouses and giant retail fulfillment centers. The underlying schema is exactly the same in all of these systems. It is characterized by the fact that in all of these systems, storage is on fixed shelves.

For example, all fulfillment systems employ the same process. In a massive fulfillment center, there are hundreds of human stowers and pickers. During an average shift, stowers may walk up to 13 miles with their carts and stepladders to stow instances of 160,000 stock keeping units (SKUs) on acres of shelving. To assemble and deliver shopping lists, hundreds of human pickers, also walking up to 13 miles per shift with their carts and stepladders, collect customer shopping lists into tote bins, which go to a team of packers.

Similarly, in a traditional shopping trip, a customer makes a shopping list, drives to a store, finds, selects, picks items from fixed shelves, and places them into a shopping cart, negotiates checkout, bags items, moves the bagged items to the customer's car, loads the bagged items into the car, and drives home. In the past, stores have been happy to let customers do all of this carrying and picking work themselves. However, the rise in online shopping has forced a sea-change by focusing on the convenience of customers in the market for groceries and other consumer products. Specifically, driven by the convenience of online shopping, brick-and-mortar stores are now taking on many of the tasks involved in the traditional shopping trip.

Analytically, most of these tasks simply involve moving individual items for sale from one space to another space and recording ownership transfers and associated charges. In most cases, this movement of items is still performed manually by either store personnel or customers. While there is significant potential for automation of CSPC, the current automation approach in fulfillment systems is to employ automation to assist human stowers, pickers, and packers, to speed up their throughput, but not to replace them. Dozens of companies now manufacture automated mobile manipulating robots (AMRs), autonomous guided vehicles (AGVs), and vision guided robots (VGRs). For example, Amazon™ is engaged in a multi-billion-dollar automation program. In around 50 of their 185 large fulfillment centers worldwide, they employ 200,000 "Roomba"-style AMRs that pick up 48" sections or stacks of storage shelves and take them to stowers and pickers to speed up their work by reducing walk time. This has resulted in more than doubling item throughput on ten-hour shifts, but imposes grueling work conditions on stowers and pickers, who must man a station to hourly place or pick up to 300 items in carts, up to 50 pounds in weight, stored high and low, on fixed shelves from the floor or a step ladder. Other automation projects for order fulfillment are underway by other companies using similar robotic vehicles. All of these systems still require human stowers and pickers, because AMRs with grippers of adequate versatility to pick items of varied sizes and shapes from stacks are not yet available, and are estimated to be years away.

In addition, complex navigation is required for the vehicles used by these fulfillment systems. The vehicles must avoid collisions and items falling out during movement (e.g., rotation, acceleration, deceleration, etc.). Furthermore, the vehicles need to be recharged, serviced, and eventually retired. There is also a safety concern. Many autonomous vehicles have to operate in a large open area, and only special maintenance workers, wearing special jackets that the autonomous vehicles can detect and avoid, are permitted within the area.

On the micro scale, the same CSPC principles apply. For example, the same CSPC system that is used in fulfillment systems is used in automated diagnostic instruments. Samples, reagents, and reaction vessels are stowed in automated instruments. To perform individual tests, carefully identified items have to be picked and carried into and out of analytic stations. Conventional diagnostic instruments utilize complex robotics to move items internally. Such robotics generally requires multiple mechanical systems that perform complex highly controlled movements, often in three dimensions. In addition, items must generally be moved between different areas within the automated system (e.g., by robotic arms with grippers) that are responsible for different processes. Thus, the cost of building and maintaining such systems can be prohibitively expensive.

In summary, the current approach to automation has been to mimic the human CSPC method, using robots to do the carrying, fixed shelves to do the stowing, and intricate robotic arms with gripper 'hands' to do the picking. Accordingly, there is the need for a fundamental change in the CSPC approach to automation, which preferably does not rely on the complex transportation and mechanical robotics now being employed by conventional automated systems.

SUMMARY

Accordingly, systems, methods, and non-transitory computer-readable media are disclosed for providing and coordinating a plurality of conveyers within an automated system.

In an embodiment, a conveyor system comprises: a plurality of nested conveyors, wherein each of the plurality of nested conveyors comprises a circular disk that is concentric around a central axis, wherein the circular disk comprises a plurality of segments that are each configured to hold at least one item on a top surface; a chute along at least one radial axis that is orthogonal to the central axis, wherein each of the plurality of nested conveyors is configured to rotate around the central axis, such that each of the plurality of segments in the circular disk of the nested conveyor is rotatable into the chute; a chute mechanism configured to radially move items, along the radial axis, across the top surfaces of all of the plurality of segments that are in the chute; and at least one hardware processor configured to, receive a list of one or more items stowed on the plurality of nested conveyors, for each item in the list, rotate a segment that is holding that item into the chute, and control the chute mechanism to, in a single operation, move all items that are held by segments in the chute out of the chute.

The conveyor system may further comprise a stationary circumferential wall between each adjacent pair of the plurality of nested conveyors, wherein each circumferential wall comprises a gap along the radial axis. Each of the plurality of nested conveyors may comprise, for each of the plurality of segments in the circular disk of the nested conveyor, a pair of fixed radial walls bounding that segment. In each pair of fixed radial walls, the radial walls may be parallel to each other. The radial walls for each of the plurality of segments in each of the plurality of nested conveyors may be spaced apart by a same distance, such that the radial walls of all segments within the chute align with each other to form a pair of parallel walls defining radial boundaries of the chute. Each of the plurality of segments of each of the plurality of nested conveyors may have a same width, and each gap may have the same width.

The at least one hardware processor may be further configured to: receive a list of one or more items held on the plurality of segments that are in the chute; identify a location at which to stow each of the one or more items held on the plurality of segment that are in the chute; and rotate a segment that is holding one of the one or more items, held on the plurality of segments that are in the chute, out of the chute to the identified location for that one item.

The at least one hardware processor may be further configured to independently control each of the plurality of nested conveyors to rotate independently from each other. Each of the plurality of nested conveyors may be configured to rotate in two directions. The at least one hardware processor may be further configured to determine in which of the two directions to rotate each of the plurality of nested conveyors so as to minimize movement.

The top surface of each of the plurality of segments in each of the plurality of nested conveyors may be textured.

The at least one hardware processor may be further configured to maintain, in each of the plurality of nested conveyors, at least one empty segment that is rotatable into the chute, such that the at least one hardware processor can always clear the chute by rotating the at least one empty segment in all of the plurality of nested conveyors into the chute.

The conveyor system may further comprise a central component that is encircled by the plurality of nested conveyors, wherein the central component comprises a central segment that is configured to hold at least one item on a top surface, and wherein the chute extends across an entire diameter of the plurality of nested conveyors and includes the central segment.

In an embodiment, a coordinated system comprises at least one level that includes a plurality of the conveyor systems, arranged side-by-side, such that the top surface of each of the plurality of segments in each of the plurality of conveyor systems is in a same plane. The at least one level may comprise a plurality of levels arranged along an axis that is orthogonal to the plane. The chute in each of the plurality of conveyor systems may be aligned with the chute in at least one adjacent one of the plurality of conveyor systems to form a composite chute that extends across two or more of the plurality of conveyor systems in the at least one level. The central component in each of the plurality of conveyor systems may be configured to rotate, and the at least one hardware processor in each of the plurality of conveyor systems may be configured to rotate the central component in that conveyor system to thereby change a direction of the chute in that conveyor system.

In an embodiment, an enclosure encloses the coordinated system, and the composite chute extends across all of the plurality of conveyor systems in the at least one level, and wherein the enclosure comprises a port at one end of the composite chute. The enclosure may be a portion of a delivery vehicle.

In an embodiment, a method comprises using at least one hardware processor, within a conveyor system that comprises a plurality of nested conveyors, each of the plurality of nested conveyors comprising a circular disk that is concentric around a central axis, the circular disk comprising a plurality of segments that are each configured to hold at least one item on a top surface, a chute along at least one radial axis that is orthogonal to the central axis, each of the plurality of nested conveyors configured to rotate around the central axis, such that each of the plurality of segments in the circular disk of the nested conveyor is rotatable into the chute, and a chute mechanism configured to radially move items, along the radial axis, across the top surfaces of all of the plurality of segments that are in the chute, to: receive a list of one or more items stowed on the plurality of nested conveyors; for each item in the list, rotate a segment that is holding that item into the chute; and control the chute mechanism to, in a single operation, move all items that are held by segments in the chute out of the chute.

In an embodiment, a conveyor system comprises: a plurality of parallel linear conveyors, wherein each of the plurality of parallel linear conveyors comprises a plurality of segments along a longitudinal axis of the parallel linear conveyor, and wherein each of the plurality of segments is configured to hold at least one item on a top surface; one or more chutes along an orthogonal axis that is orthogonal to the longitudinal axis of each of the plurality of parallel linear conveyors, wherein each of the plurality of parallel linear conveyors is configured to move along the respective longitudinal axis, such that each of the plurality of segments of the parallel linear conveyor is movable into at least one of the one or more chutes; a chute mechanism configured to orthogonally move items, along the orthogonal axis, across the top surfaces of all of the plurality of segments that are in the at least one chute; and at least one hardware processor configured to, receive a list of one or more items stowed on the plurality of parallel linear conveyors, for each item in the list, move a segment that is holding that item into the chute, and control the chute mechanism to, in a single operation, move all items that are held by segments in the chute out of the chute.

In an embodiment, a conveyor system comprises: a plurality of conveyors, wherein each of the plurality of conveyors comprises a plurality of segments, and wherein each of the plurality of segments is configured to hold at least one item on a top surface; one or more chutes along at least one axis, wherein each of the plurality of conveyors is configured to move such that each of the plurality of segments of the conveyor is movable into at least one of the one or more chutes; a chute mechanism configured to move items, along the at least one axis, across the top surfaces of all of the plurality of segments that are in the at least one chute; and at least one hardware processor configured to, receive a list of one or more items stowed on the plurality of conveyors, for each item in the list, move a segment that is holding that item into the chute, and control the chute mechanism to, in a single operation, move all items that are held by segments in the chute out of the chute.

It should be understood that any of the features described above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In an embodiment, systems and methods are disclosed for providing and using coordinated merry-go-round conveyor systems within an automated system. The disclosed conveyor technology is highly scalable, and may be used in macro-scale contexts (e.g., warehouse or retail fulfillment), mid-scale contexts (e.g., automated pantries, household or commercial freezers, and office storerooms), micro-scale contexts (e.g., automated diagnostic instruments), and anywhere between and beyond.

Figure 1:
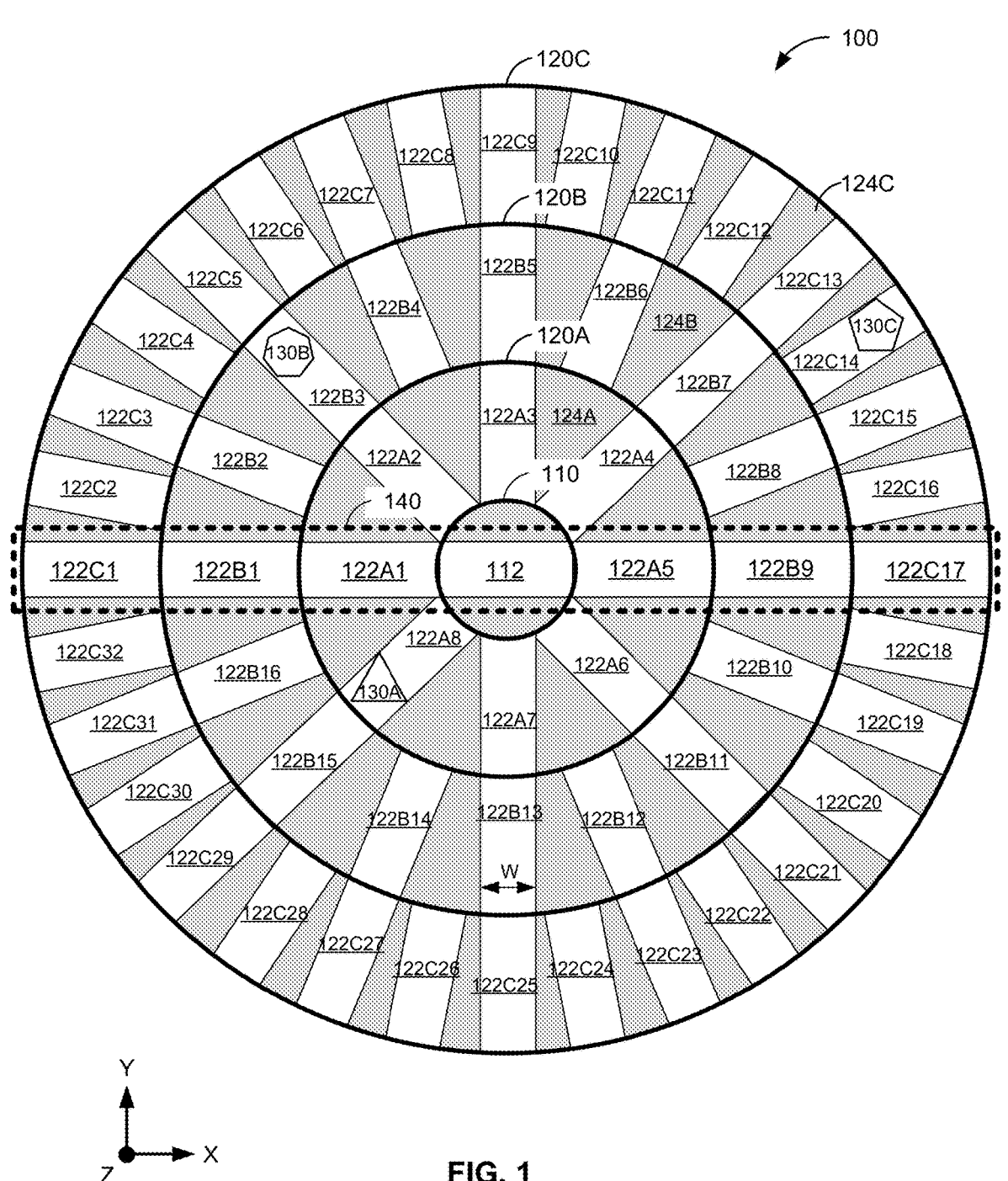
FIG. 1 illustrates a top-down view of a merry-go-round conveyor system, according to an embodiment.

FIG. 1 illustrates a top-down view of a merry-go-round conveyor system 100, according to an embodiment. Conveyor system 100 comprises a central component 110 and a plurality of nested conveyors 120. In the illustrated example, conveyor system 100 consists of three conveyors 120A, 120B, and 120C. However, it should be understood that conveyor system 100 could comprise or consist of any number of conveyors 120, including one conveyor 120, two conveyors 120, four conveyors 120, five conveyors 120, and so on and so forth. In an alternative embodiment, central component 110 could be omitted, such that conveyor system 100 comprises an open aperture at its center.

Each conveyor 120 is concentric with every other conveyor 120, as well as central component 110. Every conveyor 120, except for the outermost conveyor 120 (e.g., 120C in the illustrated embodiment), is nested within an outer conveyor 120. For example, conveyor 120A is a disk with an open central aperture sized to encircle central component 110, conveyor 120B is a disk with an open central aperture sized to encircle conveyor 120A, and conveyor 120C is a disk with an open central aperture sized to encircle conveyor 120B. It should be understood that any number of conveyors 120 may be nested around a central Z-axis (i.e., through the center of central component 110) in this manner.

Each conveyor 120 comprises a plurality of segments 122. For example, conveyor 120A comprises segments 122A1-122A8, conveyor 120B comprises segments 122B1-122B16, and conveyor 120C comprises segments 122C1-122C32. Each segment 122 is configured to hold at least one item 130 on a top surface of the segment 122. For example, segment 122A8 holds an item 130A, segment 122B3 holds an item 130B, and segment 122C14 holds an item 130C. While only three items 130 are illustrated, it should be understood that merry-go-round conveyor system 100 may hold any number of items 130 on any number of segments 122. Furthermore, while only one item 130 is illustrated per segment 122, a single segment 122 could be configured to hold a plurality of items 130. The top surface of every segment 122 in every conveyor 120 in a given conveyor system 100 may be in the same X-Y plane.

Adjacent segments 122 around the same conveyor 120 may be separated from each other by a space 124, which may be wedge-shaped. For example, conveyor 120A comprises wedge-shaped spaces 124A between each segment 122A1-122A8, conveyor 120B comprises wedge-shaped spaces 124B between each segment 122B1-122B16, and conveyor 120C comprises wedge-shaped spaces 124C between each segment 122C1-122C32. Wedge-shaped spaces 124 provide each segment 122 with parallel boundaries radiating through the respective conveyor 120, such that each segment 122 is substantially rectangular in shape. Although, it should be understood that the radially inner and outer boundaries may be slightly curved, since they are chords of a circle. In an alternative embodiment, segments 122 may be wedge-shaped and spaces 124 may have parallel boundaries radiating through the respective conveyor 120. In another alternative embodiment, segments 122 may be wedge-shaped and spaces 124 may be omitted.

Each segment 122 may be configured to hold only a single item 130 or a plurality of items 130. In an embodiment, each segment 122 has the same width W within the same conveyor 120, and optionally, across the entire conveyor system 100. Alternatively, some segments 122 may have different dimensions (e.g., shape and/or size) than other segments 122, within the same conveyor 120 and/or across different conveyors 120. For example, all segments 122 within the same conveyor may have the same dimensions, but the segments 122 of one conveyor 120 may have different dimensions than the segments 122 of another conveyor 120. For instance, radially inner conveyors 120 may have smaller dimensions than radially outer conveyors 120 within the same conveyor system 100. Thus, some segments 122 may be configured to hold more items 130 than other segments 122 on the same conveyor 120 and/or a different conveyor 120.

Each conveyor 120 may be configured to rotate around the central Z-axis in one or both directions (e.g., clockwise and/or counter-clockwise in the top-down view). Preferably, each conveyor 120 is configured to rotate in both directions. The rotation of each conveyor 120 may be independent from the rotation of any other conveyor 120. For example, each of conveyors 120A, 120B, and 120C may be configured to rotate in both directions, independently from the others of conveyors 120A, 120B, and 120C.

Each conveyor 120 may be configured to only stop rotating at one of a plurality of indexed positions. Each indexed position represents a fixed radian amount around the central Z-axis. If a control signal is received that indicates that the rotation of a conveyor 120 is to be stopped, conveyor 120 may continue rotating until it reaches the closest indexed position, and stop only once it reaches that closest indexed position. In other words, conveyor 120 will continue rotating in the current direction for the minimum amount necessary to reach the next indexed position. The number of indexed positions at which a conveyor 120 may stop may be the same as the number of segments 122 in that conveyor 120. For example, conveyor 120A, which has eight segments 122A1-122A8, may have eight indexed positions, conveyor 120B, which has sixteen segments 122B1-122B16 may have sixteen indexed positions, and conveyor 120C, which has thirty-two segments 122C1-122C32 may have thirty-two indexed positions.

In an embodiment, in every indexed position for each conveyor 120, one segment 122 is centered within a chute 140. In the illustrated example, segments 122A1 and 122A5 of conveyor 120A, segments 122B1 and 122B9 of conveyor 120B, and segments 122C1 and 122C17 of conveyor 120C, are all within chute 140. Chute 140 represents both an entry path onto merry-go-round conveyor system 100 and an exit path off of merry-go-round conveyor system 100. In particular, an item 130 stowed on a segment 122 within chute 140 may be radially pushed or pulled off of merry-go-round conveyor system 100 into an external environment. Similarly, an item 130 that is not currently stowed on merry-go-round conveyor system 100 may be radially pushed or pulled from an external environment onto a segment 122 within chute 140. In this manner, all items 130 that are on segments 122 within chute 140 may be swept off in a single push or pull operation.

As described herein, anytime an item 130 is being pulled, such pulling may be performed by a robotic picker (e.g., robotic arm with clamp or other pulling mechanism), and anytime an item 130 is being pushed, such pushing may be performed by a robotic pusher (e.g., robotic arm with block or other pushing mechanism). It is generally contemplated that pushing may be preferable, since pushing items 130 will typically require less mechanical complexity. In an embodiment in which segments 122 are wedge-shaped, a robotic pusher in chute 140 may comprise a push paddle surface that expands (e.g., via spring) and contracts (e.g., via wheels or other elements that contact the radial walls of chute 140) in width as it traverses chute 140. After each operation, whether the chute mechanism is a robotic picker or robotic pusher, the chute mechanism may be reset to a starting position for the next sweep of chute 140.

In the illustrated example, chute 140 consists of, in order from one side to the opposite side of conveyor system 100, segment 122C1 in conveyor 120C, segment 122B1 in conveyor 120B, segment 122A1 in conveyor 120A, central segment 112 in central component 110, segment 122A5 in conveyor 120A, segment 122B9 in conveyor 120B, and segment 122C17 in conveyor 120C. In this embodiment, chute 140 extends across the entire conveyor system 100 from one side to the opposite side. However, in an alternative embodiment, chute 140 may extend across only half of conveyor system 100 between one side and the edge of central component 110. For example, in the illustrated example, chute 140 could instead consist of, in order from an outside of conveyor system 100, segment 122C1 in conveyor 120C, segment 122B1 in conveyor 120B, and segment 122A1 in conveyor 120A, or alternatively, segment 122C17 in conveyor 120C, segment 122B9 in conveyor 120B, and segment 122A5 in conveyor 120A. In this case, central segment 112 may be omitted and, for instance, replaced with a central chute mechanism (e.g., robotic pusher and/or picker).

In an embodiment, conveyor system 100 may consist of only a single diameter chute 140. In this case, in an embodiment in which chute 140 extends across the entire merry-go-round conveyor system 100, central component 110 may be fixed or stationary, such that central segment 112 always remains in the same orientation (i.e., aligned with chute 140). Alternatively, conveyor system 100 could comprise a plurality of potential chutes 140. For instance, in addition to chute 140, merry-go-round conveyor system 100 could be configured to have one or more additional chutes consisting of: segments 122C9, 122B5, 122A3, 112, 122A7, 122B13, and 122C25; segments 122C5, 122B3, 122A2, 112, 122A6, 122B11, and 122C21; and/or segments 122C29, 122B15, 122A8, 112, 122A4, 122B7, and 122C13. In this case, central component 110 may be configured to rotate around the central Z-axis, such that central segment 112 can be oriented in a plurality of indexed positions, such as orthogonally to the X-axis, at a 45-degree angle with respect to the X-axis, at one or more other angles with respect to the X-axis, and/or the like, to align with a desired direction of chute 140. In an alternative embodiment, in which chute 140 does not extend across the entire merry-go-round conveyor system 100, possible chutes 140 could include: segments 122C1, 122B1, and 122A1; segments 122A5, 122B9, and 122C17; segments 122C9, 122B5, and 122A3; segments 122A7, 122B13, and 122C25; segments 122C5, 122B3, and 122A2; segments 122A6, 122B11, and 122C21; segments 122C29, 122B15, and 122A8; and/or segments 122A4, 122B7, and 122C13. In each case, chute 140 is aligned with a radial axis orthogonal to the central Z-axis.

It should be understood that the above references to segments 122 within chute 140 are simply examples based on a single snapshot of conveyors 120 in FIG. 1. During operation, any of segments 122 may be rotated into chute 140. In particular, each of the plurality of nested conveyors 120 is configured to rotate around the central Z-axis, such that each and every one of the plurality of segments 122 in the circular disk of the nested conveyor 120 is rotatable into chute 140. In addition, any segment 122 on one conveyor 120 may be aligned with any segment 122 on another conveyor 120, within chute 140, by independently rotating each conveyor 120.

Figure 2A:
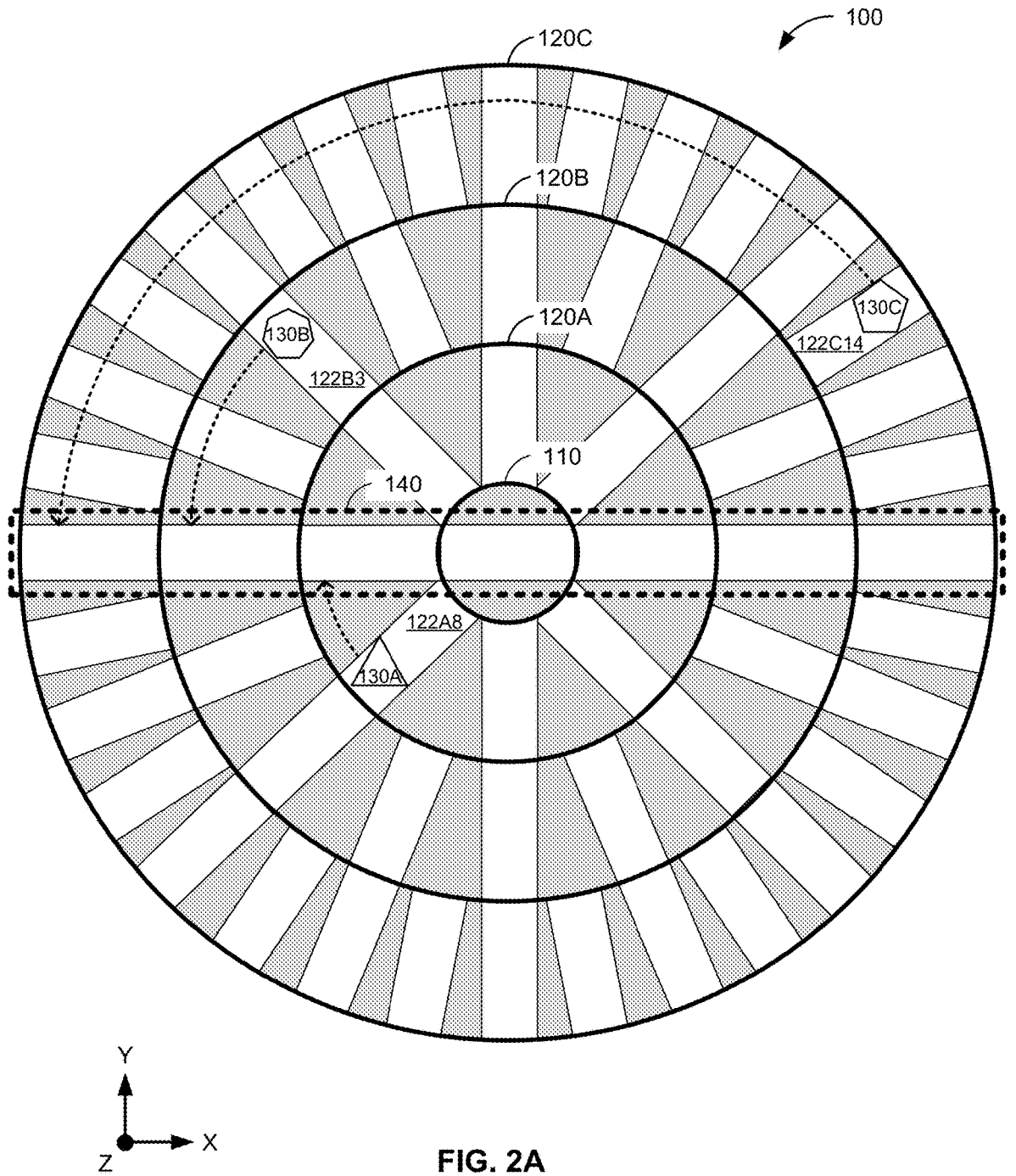
FIGS. 2A-2C illustrate top-down views during operation of a merry-go-round conveyor system, according to an embodiment.
Figure 2B:
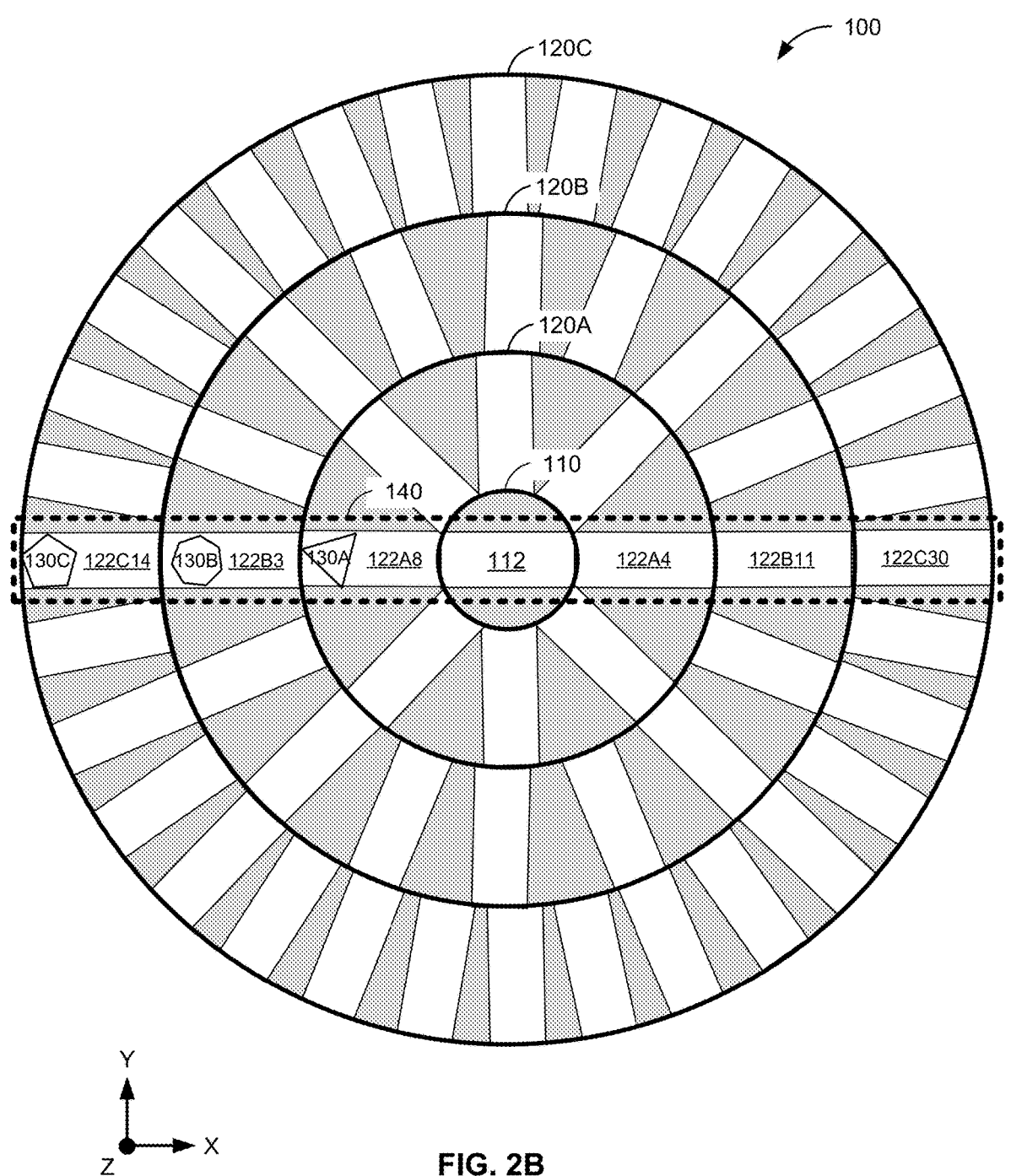
Figure 2C:
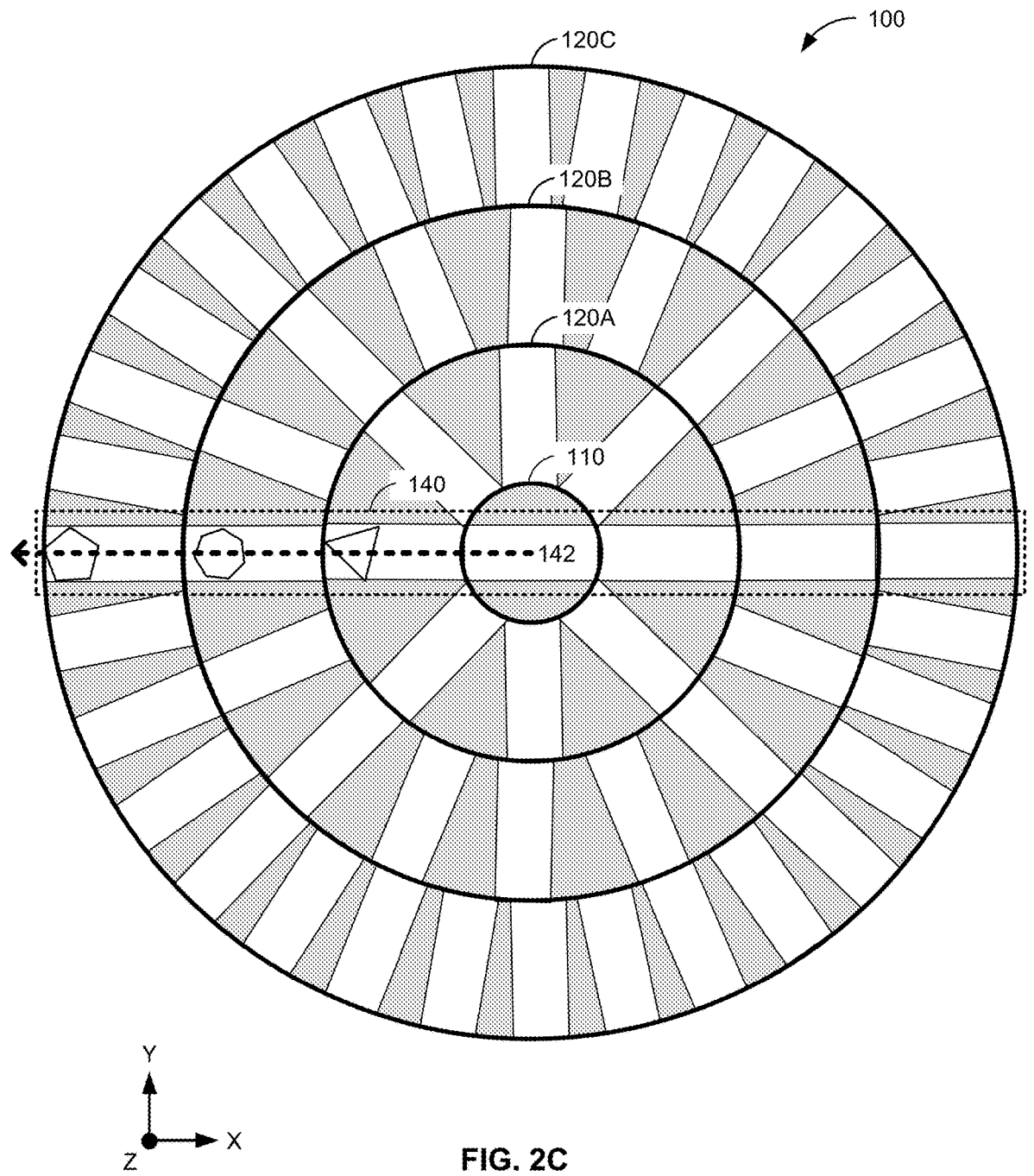

FIGS. 2A-2C illustrate top-down views during operation of a merry-go-round conveyor system 100, according to an embodiment. In the illustrated example, it is assumed that items 130A, 130B, and 130C are to be aligned in chute 140. For instance, a control system may determine that items 130A, 130B, and 130C are to be offloaded from conveyor system 100 together as a set (e.g., for packaging, delivery, as an order or part of an order, etc.). Thus, the control system may determine the optimal direction of rotation for each conveyor 120 to place each item 130 into chute 140. It should be understood that the optimal direction may be the direction that requires the least amount of rotation (e.g., traversal of the fewest indexed positions) and/or satisfies one or more other criteria.

As illustrated in FIG. 2A, the control system identifies the segment 122 on which each desired item 130 is stowed, and determines a rotation for each conveyor 120 that is involved. In this example, item 130A is stowed on segment 122A8, item 130B is stowed on segment 122B3, and item 130C is stowed on segment 122C14. The control system determines that the optimal movement is to rotate conveyor 120A clockwise one position, rotate conveyor 120B counterclockwise two positions, and rotate conveyor 120C counterclockwise thirteen positions.

Next, as illustrated in FIG. 2B, the control system rotates each conveyor 120, according to the optimal movement, to place the identified segments 122 within chute 140. In particular, segments 122A8, 122B3, and 122C14 are all rotated into alignment in chute 140. Consequently, items 130A, 130B, and 130C are aligned in chute 140.

As illustrated in FIG. 2C, items 130 may be pushed off of conveyor system 100 via chute 140. In particular, chute 140 forms a chute path 142 along its longitudinal axis. Thus, for example, a robotic pusher may slide a block or paddle across the top surface of segments 112 within chute 140, along chute path 142, to push items 130 off of conveyor system 100 as a single group or unit in a single operation. Alternatively, a robotic picker may pull items 130 off of merry-go-round conveyor system 100 in a single operation or multiple operations. It should be understood that the number of items 130 that can be simultaneously moved off of conveyor system 100 at once within a chute 140 may be dictated by the number of conveyors 120, whether or not chute 140 extends across the entire conveyor system 100 or just half of the conveyor system 100, the number of items 130 stowed on each segment 122, and/or the like.

It should be understood that chute 140 may comprise items 130 on every segment 122 of a conveyer 120 within chute 140 or on only a subset of segments 122 within chute 140. For example, referring to FIG. 2B, segments 122A4, 122B11, and 122C30 could also hold items 130. In this case, all of the items (e.g., six items 130 in this example) could be moved out of chute 140 at once (e.g., by sweeping items 130 from one side of conveyor system 100 to the opposite side of conveyor system 100). Alternatively, items 130 on segments 122A8, 122B3, and 122C14 could be moved along chute path 142 (e.g., by radially sweeping items 130 outward from central component 110), and items 130 on segments 122A4, 122B11, and 122C30 could be moved along a chute path in the opposite direction of chute path 142 (e.g., by radially sweeping items 130 outward from central component 110).

Items 130 may be stowed on conveyor system 100 in a similar manner. In particular, an item 130 may be pulled or pushed onto a respective segment 122 within chute 140. Just as a plurality of items 130 may be moved off of conveyor system 100 in a single operation, a plurality of items 130 may be moved on to conveyor system 100 as a single group or unit in a single operation. Alternatively, items 130 may be moved on to conveyor system 100 one at a time. Once an item 130 has been moved on to a segment 122 in chute 140, that segment 122 may be rotated out of chute 140 to another indexed position, to thereby stow item 130 for a later operation and/or to move another segment 122 into chute 140.

Chute 140 may also be used to move an item 130 from one conveyor 120 to another conveyor 120. For example, assume that item 130A is to be moved from conveyor 120A to conveyor 120C. In this case, segment 122A8 in conveyor 120A, which stows item 130A, is rotated into chute 140, and a destination segment 122 in conveyor 120C, to which item 130A is to be moved, is rotated into chute 140. In addition, an empty segment 122 in conveyor 120B is rotated into chute 140. Then, item 130A is radially pushed or pulled within chute 140 from conveyor 120A, across conveyor 120B, to conveyor 120C. After this movement, conveyor 120C may be rotated to position the destination segment 122 in conveyor 120C, on which item 130A is now stowed, at a destination location. In this manner, items 130 may be sorted within conveyor system 100 via a set of rotations and pushes.

Figure 3:
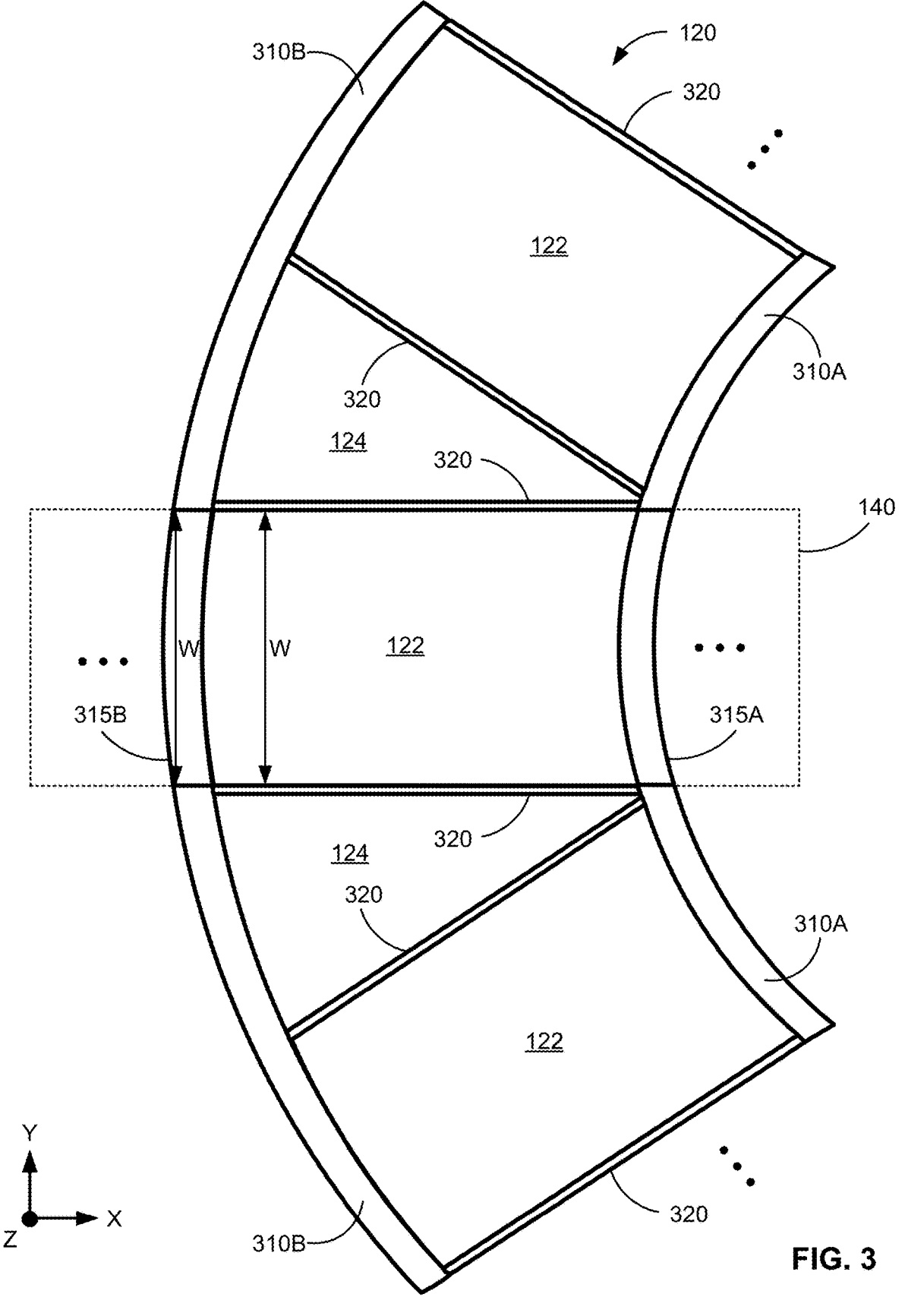
FIG. 3 illustrates segments of a merry-go-round conveyor system, according to an embodiment.

FIG. 3 illustrates segments 122 of a merry-go-round conveyor system 100, according to an embodiment. It should be understood that only a portion of a single conveyor 120 is illustrated, in order to provide a closer view of segments 122. Each segment 122, within a conveyor 120 and/or across a plurality of conveyors 120, may be similar or identical.

Each conveyor 120 may be bordered on both the inner circumference and the outer circumference by a circumferential wall 310. For example, the inner circumference of conveyor 120 encircles an inner circumferential wall 310A, and the outer circumference of conveyor 120 is encircled by an outer circumferential wall 310B. It should be understood that the inner circumferential wall 310A of a first conveyor 120 may be the outer circumferential wall 310B of a second, radially inner conveyor 120, and/or the outer circumferential wall 310B of the first conveyor 120 may be the inner circumferential wall 310A of a second, radially outer conveyor 120. Each circumferential wall 310 may be stationary with respect to the movement of conveyors 120. For example, each circumferential wall 310 may be fixed to a base of conveyor system 100, such that circumferential wall 310 does not move with the rotation of conveyors 120.

Each circumferential wall 310 may have a gap 315 where the circumferential wall 310 intersects chute 140. For example, inner circumferential wall 310A has a gap 315A, and outer circumferential wall 310B has a gap 315B. Each gap 315 may have a width W that is substantially equal to the width W of each segment 122. The top surface of each gap 315 is recessed along the Z-axis from a top surface of each circumferential wall 310. In addition, the top surface of each gap 315 may be flush with the top surface of each segment 122, such that items 130 can easily slide through gap 315 from a first segment 122 of a first conveyor 120 within chute 140 to a second segment 122 of a second conveyor 120 within chute 140. It should be understood that the top surface of each segment 122 within chute 140 will be flush with the top surface of each gap 315 within chute 140, such that an item 130 can be slid, by either pushing or pulling, across the top surfaces of segments 122 and gaps 315, from one end of chute 140 to the other end of chute 140.

Each segment 122 may be bordered on both radial sides by a pair of radial walls 320. It should be understood that, as used herein, the term "radial" does not necessarily mean perfectly radial from the central Z-axis of merry-go-round conveyor system 100. Rather, the term "radial" may refer to any line or direction that intersects both the inner circumference and outer circumference of a conveyor 120. Accordingly, a radial wall 320 may or may not intersect the central Z-axis of merry-go-round conveyor system 100, depending on the particular design. Each pair of radial walls 320 bordering a given segment 112 may be parallel to each other. Unlike circumferential walls 310, radial walls 320 are fixed to conveyor 120, such that they rotate with the conveyor 120.

Collectively, when a segment 122 is positioned with chute 140, the top surface of the segment 122 and the pair of radial walls 320 form a channel to guide items 130 along chute 140, through gaps 315, across conveyors 120. Notably, the radial walls 320 of segments 122 within chute 140 align with each other, to form a parallel pair of substantially contiguous walls defining the longitudinal boundaries of chute 140. In other words, the radial walls 320 for each of the plurality of segments 122 in each of the plurality of conveyors 120 may be spaced apart by the same distance (e.g., width W), such that the radial walls 320 of all segments 122 within chute 140 align with each other to form a pair of parallel walls defining the radial boundaries of chute 140. This enables the chute mechanism to safely sweep all items 130 within chute 140, radially, to the external environment (e.g., another chute 140, a shipping container, a tote bin, etc.).

In an alternative embodiment in which radial walls 320 extend along a true radius of conveyor system 100, segments 122 will become progressively larger in area from the innermost conveyor 120 to the outermost conveyor 120. In this case, items 130 that are stowed on inner conveyors 120 may be generally smaller than items 130 that are stowed on larger conveyors 120. In addition, chute 140 may progressively widen from the innermost conveyor 120 to the outermost conveyor 120. Accordingly, a robotic pusher may comprise a paddle that expands to fill each gap 315 along chute 140.

When a segment 122 is not positioned within chute 140, inner circumferential wall 310A and outer circumferential wall 310B prevent an item 130 on the segment 122 from sliding radially off of the segment 122. Whether the segment 122 is positioned within chute 140 or outside chute 140, the pair of radial walls 320 bordering the segment 122 prevent the item 130 from sliding circumferentially off of the segment 122 into the surrounding spaces 124 and/or another segment 122.

The top surface of each conveyor 120 may be textured to provide a suitable amount of friction for items 130. In particular, the friction should be sufficient to prevent an item 130 from sliding during rotation of conveyor 120, but allow the item 130 to slide when the force of the chute mechanism (e.g., robotic pusher or picker) is applied. In the event that the chute mechanism is a robotic pusher, the pusher arm should press gently on an item 130, with sufficient force to overcome the friction, but not enough force to impart item 130 with its own momentum. The applied force may be detected by a pressure sensor in the pusher arm. The top surface of a conveyor 120 may have different friction properties at different radial positions. For example, the top surface could have greater friction in the radial center of each segment 122 to hold item 130 during rotation, but less friction at the radial inner and outer edges of each segment 122 to allow item 130 to easily slide onto and off of conveyor 120 once item 130 has been moved out of the radial center. In addition, the rotation of conveyors 120, including acceleration and deceleration, should be suitably smooth, with respect to the friction of the top surfaces, to prevent sliding of items 130 along the top surfaces during rotation.

In an embodiment that possesses one or more of the above characteristics, so as to prevent items 130 from sliding during rotation, circumferential walls 310 and/or radial walls 320 may be omitted. Conversely, embodiments with circumferential walls 310 and/or radial walls 320 may omit the above characteristics, since items 130 may be confined to their respective segments 122 by the set of circumferential walls 310 and radial walls 320.

Figure 4A:
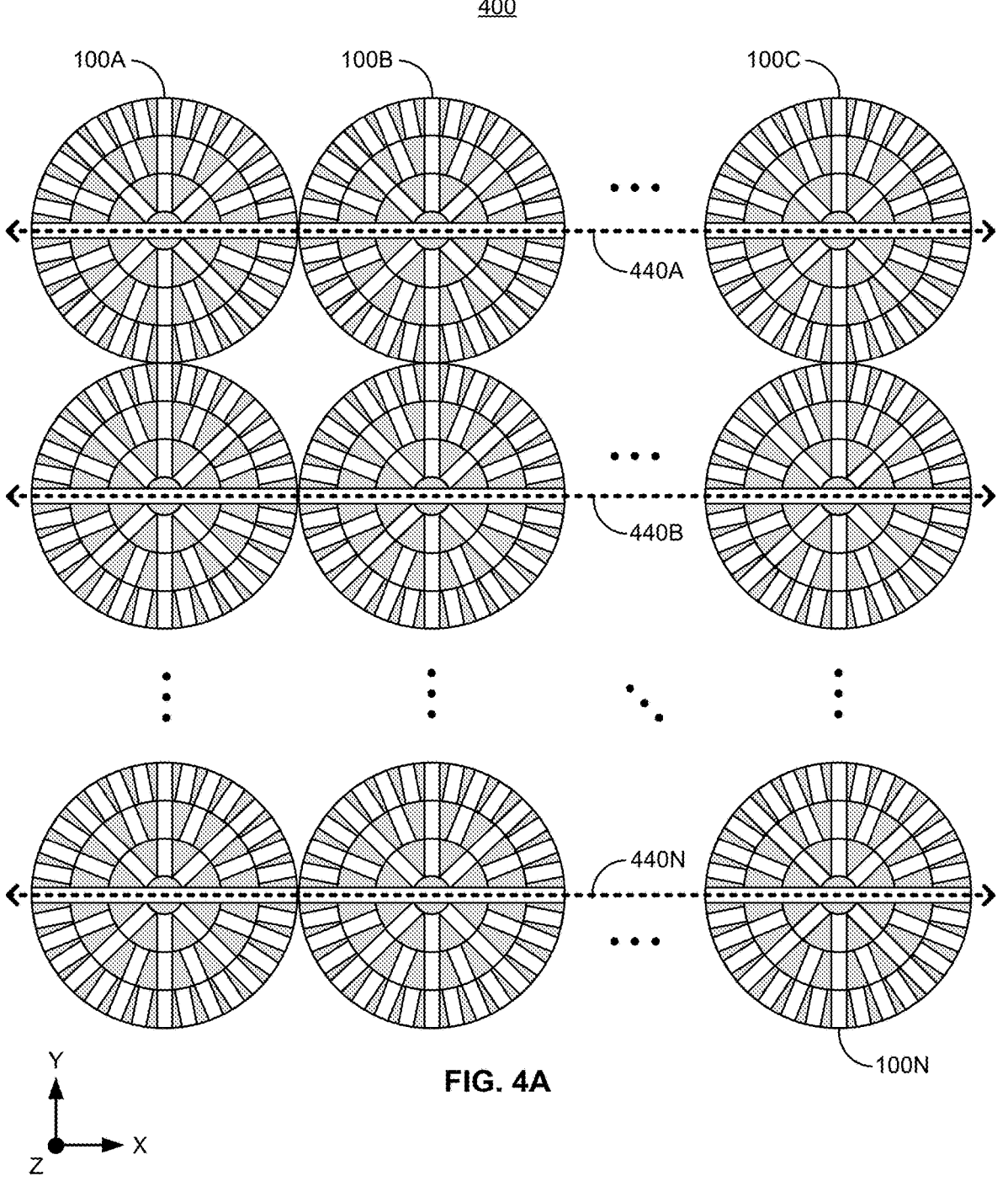
FIGS. 4A-4C illustrate a coordinated system of merry-go-round conveyor systems, according to an embodiment.
Figure 4B:
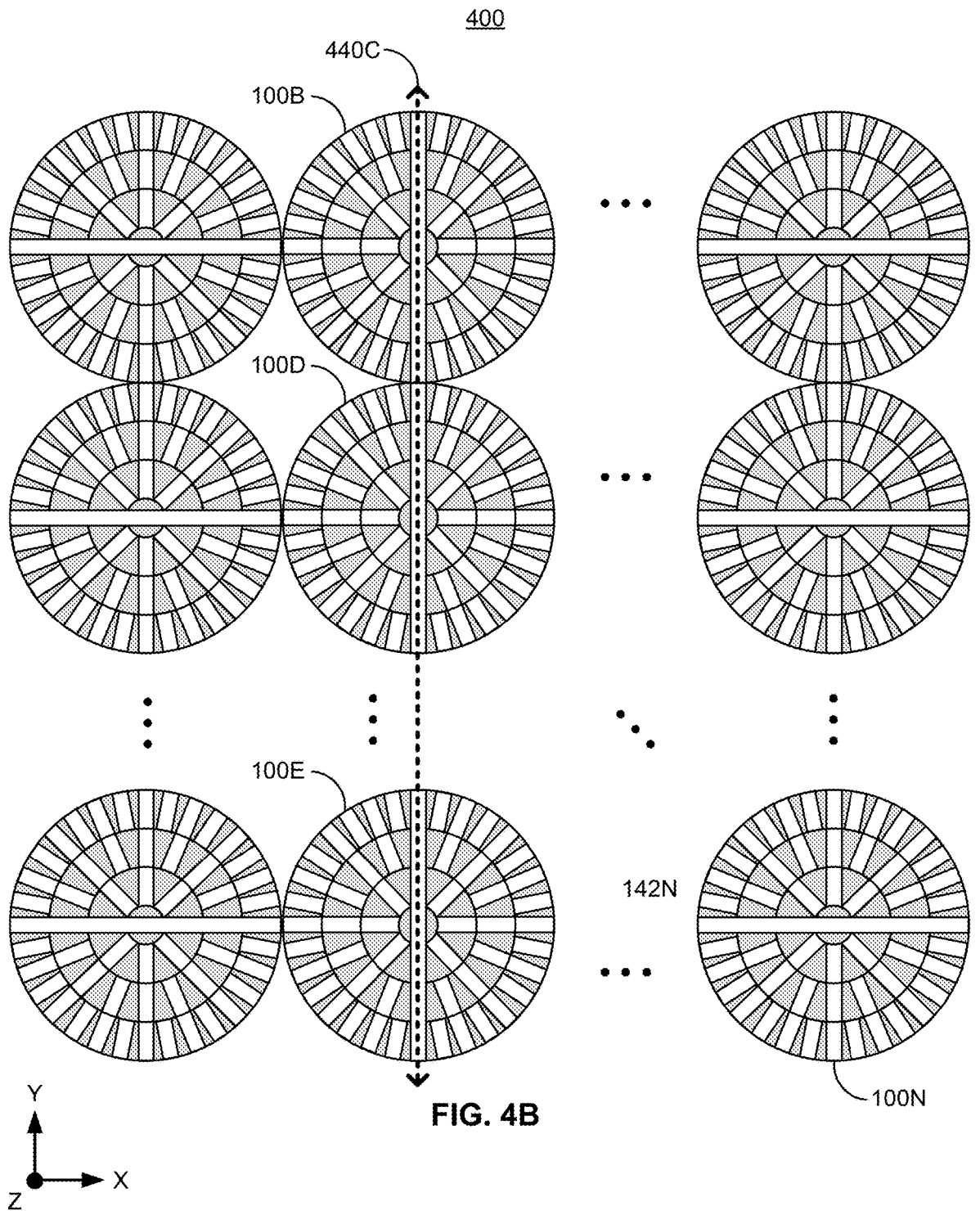
Figure 4C:
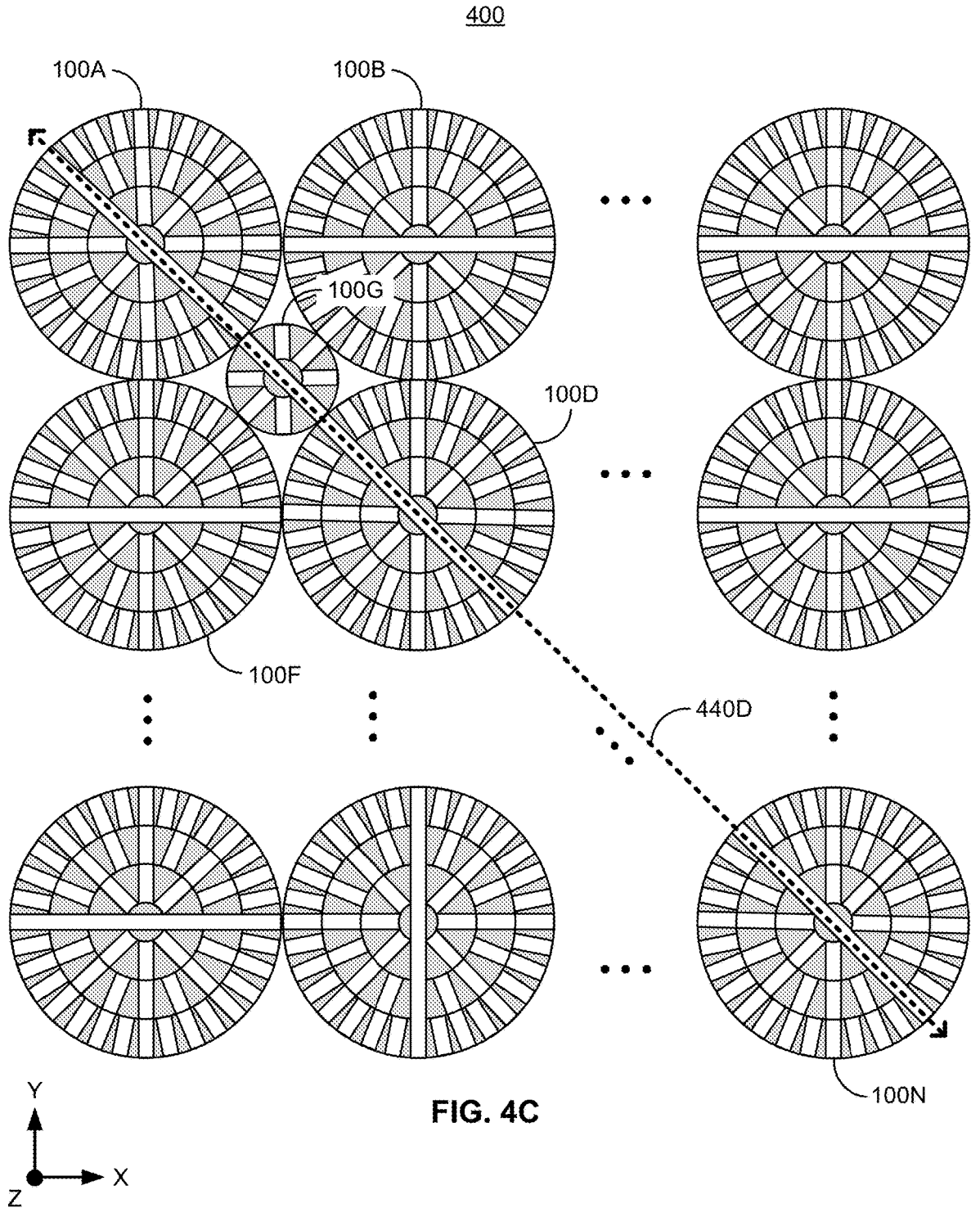

FIGS. 4A-4C illustrate a coordinated system 400 of merry-go-round conveyor systems 100, according to an embodiment. As illustrated, coordinated system 400 may comprise a plurality of conveyor systems 100, arranged in the X-Y plane. While coordinated system 400 is illustrated as comprising a grid of conveyor systems 100, conveyor systems 100 could be configured in other arrangements. Each conveyor system 100 within coordinated system 400 may be identical, or one or more conveyor systems 100 may be different (e.g., in terms of size, number of conveyors 120, number of segments 122, etc.) than one or more other conveyor systems 100 in the same coordinated system 400.

Each conveyor system 100 may be adjacent and in contact with at least one other conveyor system 100, such that a segment 122 in the outermost conveyor 120 of the conveyor system 100 aligns with a segment 122 in the outermost conveyor 120 of the adjacent conveyor system 100. Thus, any segment 122 in the outermost conveyor 120 of the conveyor system 100 can be rotated into alignment with any segment 122 in the outermost conveyor 120 of the adjacent conveyor system 100. A conveyor system 100 may be adjacent to one, two, three, four, or more other conveyor systems 100, depending on the particular implementation of coordinated system 400.

The chute 140 in each conveyor system 100 may be aligned with the chute 140 in at least one adjacent conveyor system 100, such that composite chutes 440 may be formed across a plurality of conveyor systems 100. For instance, as illustrated in FIG. 4A, a plurality of composite chutes 440A, 440B, . . . , 440N may be formed along the X-axis. An item 130 may be moved across a portion or the entirety of a composite chute 440, including from one side of coordinated system 400 to the opposite side of coordinated system 400, from one side of coordinated system 400 to the interior of coordinated system 400, from the interior of coordinated system 400 to one side of coordinated system 400, and from one segment 122 in the interior of coordinated system 400 to another segment in the interior of coordinated system 400.

For example, an item 130 may be moved from a first side of chute 140 of conveyor system 100A to an opposing second side of chute 140 of conveyor system 100A, moved from the second side of chute 140 of conveyor system 100A to the first side of chute 140 of conveyor system 100B, moved from the first side of chute 140 of conveyor system 100B to the second side of chute 140 of conveyor system 100B, moved from the second side of chute 140 of conveyor system 100B to the first side of chute 140 of conveyor system 100C, and moved from the first side of chute 140 of conveyor system 100C to the second side of chute 140 of conveyor system 100C, to thereby move item 130 across the entire X-axis of coordinated system 400.

As another example, an item 130, stowed on conveyor system 100B may be rotated into chute 140 of conveyor system 100B, moved from chute 140 of conveyor system 100B into chute 140 of conveyor system 100A, and then moved out of chute 140 of conveyor system 100A to an external environment or rotated out of chute 140 and into a stowage position on conveyor system 100A.

As yet another example, an item may be moved from an external environment of conveyor system 100A into chute 140 of conveyor system 100A, moved from chute 140 of conveyor system 100A into chute 140 of conveyor system 100B, and then moved out of chute 140 of conveyor system 100B to another adjacent conveyor system 100 or rotated out of chute 140 and into a stowage position on conveyor system 100B.

In an embodiment in which central component 110 is rotatable, such that central segment 112 can be rotated in one or more conveyor systems 100, the direction of a chute 140 can be changed. This means that the direction of a composite chute 440 can also be changed. For example, as illustrated in FIG. 4B, central components 110 of each of a series of conveyor systems 100 along the Y-axis may be rotated to align their central segments 112 along the Y-axis. As a result, a composite chute 440C is formed along the Y-axis. Notably, composite chute 440C is orthogonal to the composite chutes 440A, 440B, and 440N, illustrated in FIG. 4A.

In an embodiment, in which central component 110 is rotatable, conveyor systems 100 of different sizes may be used to form additional composite chutes 440. For example, as illustrated in FIG. 4C, a smaller conveyor system 100G is inserted in a space formed by larger conveyor systems 100A, 100B, 100D, and 100F. The chutes 140 of conveyor system 100G may be aligned with chutes 140 of conveyor systems 100A and 100D to form a composite chute 440D along a diagonal of the X-Y plane. As illustrated, composite chute 440D may extend from one corner (e.g., represented by conveyor system 100A) of coordinated system 400 to the opposing corner (e.g., represented by conveyor system 100N) of coordinated system 400 along the diagonal.

It should be understood that any number of composite chutes 440 may be formed in the above manner, such that composite chutes 440 may be formed along multiple axes across and/or within coordinated system 400 at the same time and at different times. It should also be understood that a composite chute 440 does not have to traverse an entire dimension of coordinated system 400. Rather, a composite chute 440 may consist of as few as two adjacent conveyor systems 100. Thus, for example, a composite chute 440 may be formed from chutes 140 of conveyor systems 100B and 100D, without incorporating chutes 140 of other conveyor systems 100 along the same axis (e.g., excluding chute 140 of conveyor system 100E), which may be oriented in orthogonal or other unaligned directions. As a result, an item 130 could be moved along any path, including non-straight paths, within and through coordinated system 400. For instance, an item 130 could be moved from conveyor system 100A to conveyor system 100B along composite chute 440A, as in FIG. 4A, conveyor systems 100B and 100D may then be rotated to form composite chute 440C, as in FIG. 4B, the item 130 may then be moved from conveyor system 100B to conveyor system 100C along composite chute 440C, conveyor systems 100D and 100N may then be rotated to form composite chute 440D, as in FIG. 4C, and the item 130 may then be moved from conveyor system 100D to conveyor system 100N along composite chute 440D.

As discussed above, coordinated system 400 may comprise a plurality of cooperating conveyor systems 100. In an embodiment, each conveyor 120 or each conveyor system 100 may comprise at least one empty segment 122, and preferably a pair of empty segments 122 on opposite sides of each conveyor 120 (e.g., either 122A1 and 122A5, 122A2 and 122A6, 122A3 and 122A7, or 122A5 and 122A8 for conveyor 120A in FIG. 1), such that an open chute 140 can always be formed through a conveyor system 100 by rotating empty segment(s) 122 of each conveyor 120 in the conveyor system 100 into chute 140. Thus, a control system of coordinated system 400 may simultaneously rotate a plurality of conveyors 120 in a plurality of conveyor systems 100, to open a composite chute 440 through any portion of coordinated system 400 at any time.

Figure 5A:
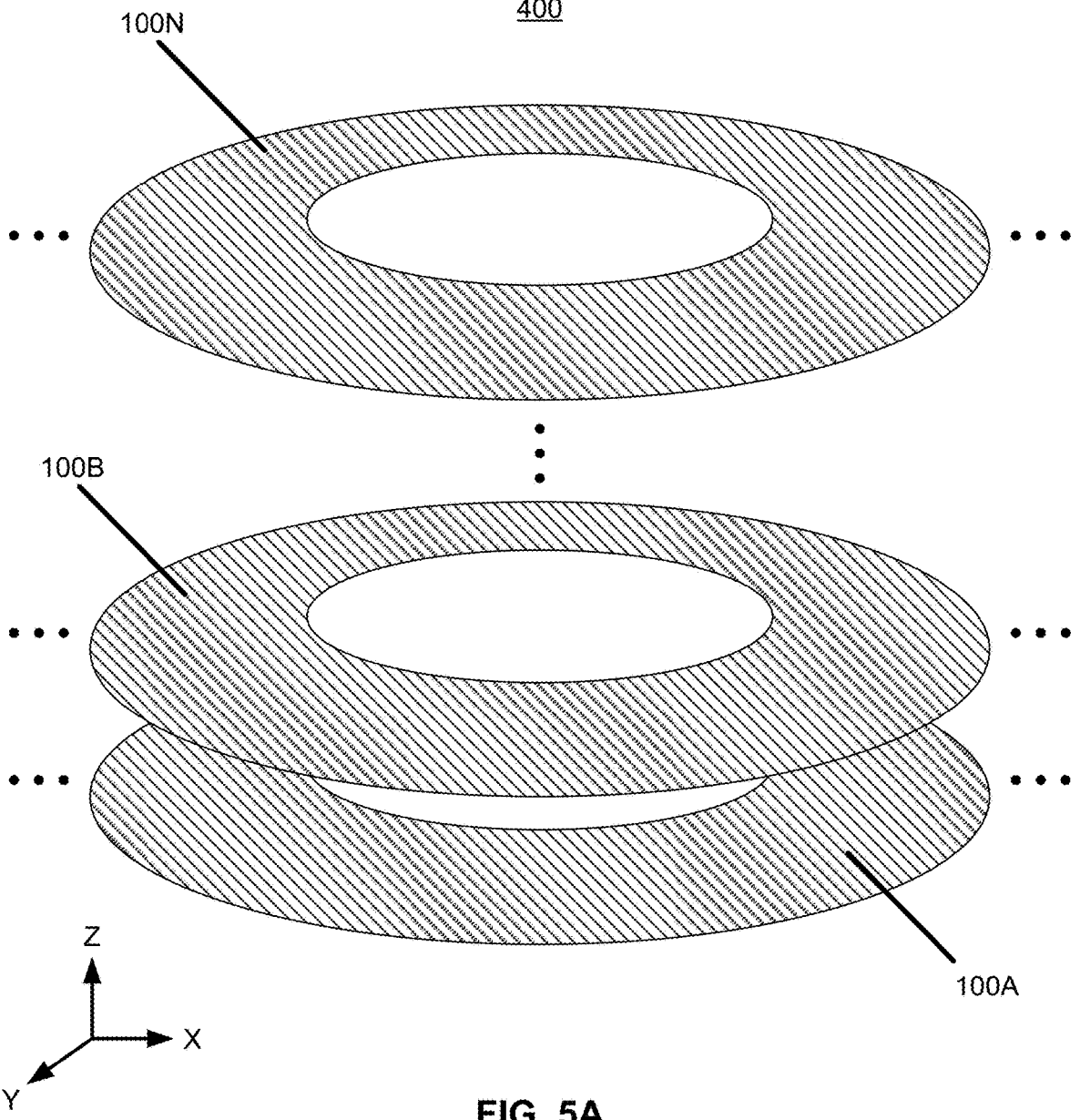
FIGS. 5A and 5B illustrate a coordinated system with a stack of merry-go-round conveyor systems, according to an embodiment.
Figure 5B:
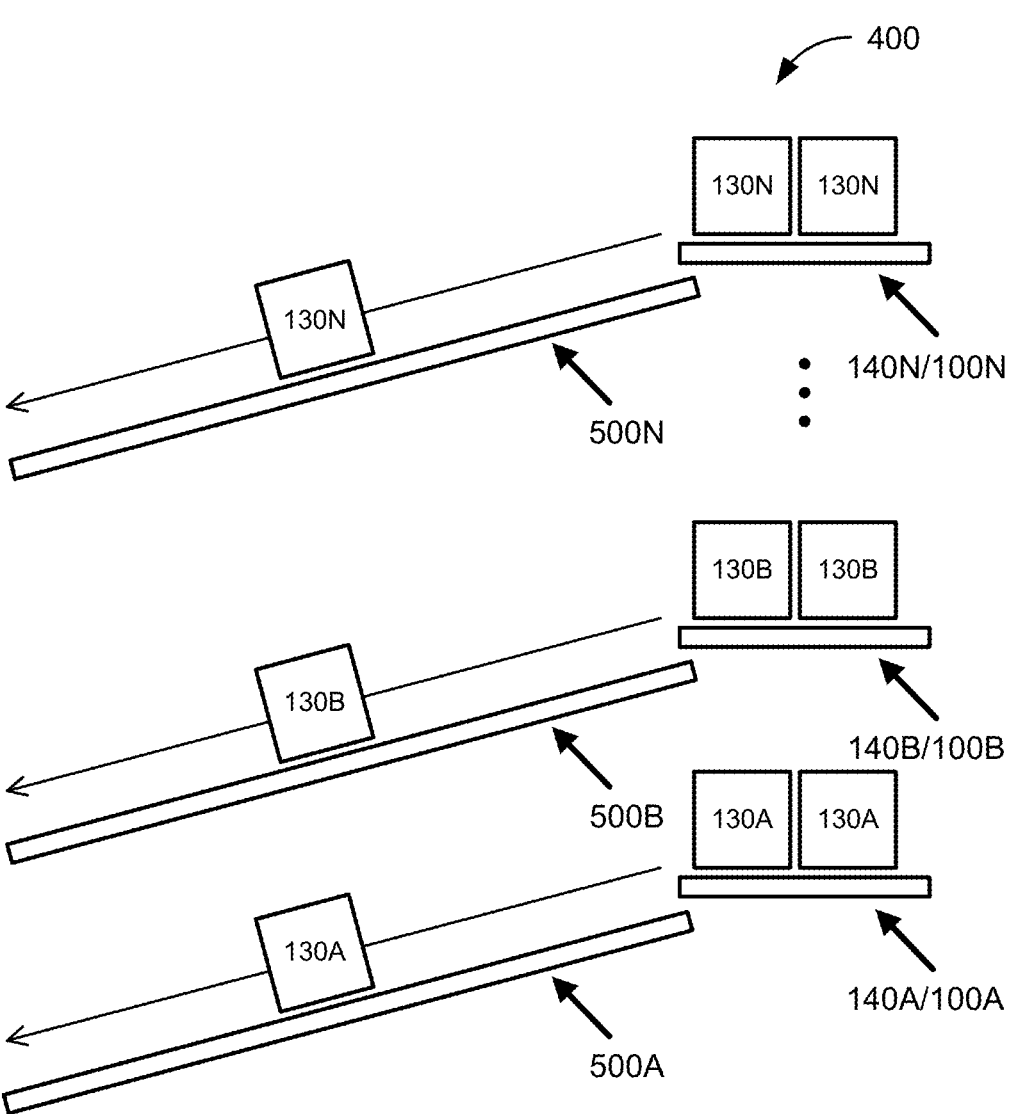

FIGS. 5A and 5B illustrate a coordinated system 400 with a stack of merry-go-round conveyor systems 100, according to an embodiment. As illustrated, a plurality of conveyor systems 100 may be stacked along the Z-axis. It should be understood that any number of conveyor systems 100 may be stacked in this manner, and is generally limited only by the height of coordinated system 400 and the spacing required, between conveyor systems 100, in order to accommodate items 130 on the respective holding surfaces. Conveyor systems 100 may be spaced equidistantly apart from each other, along the Z-axis, or the distances between conveyor systems 100, along the Z-axis, may vary.

In addition to stacking, conveyor systems 100 may be arranged side-by-side, as in FIGS. 4A-4C. Thus, coordinated system 400 may comprise a plurality of conveyor systems 100 arranged in one dimension (i.e., along the X-axis, Y-axis, or Z-axis), two dimensions (e.g., along the X-axis and Y-axis, along the X-axis and Z-axis, or along the Y-axis and Z-axis), or three dimensions (e.g., along all three of the X-axis, Y-axis, and Z-axis). Any number of conveyor systems 100 may be arranged in either dimension, to form a coordinated system 400 that enables any item 130, whether near the edge of coordinated system 400 or near the center of coordinated system 400, to be stowed and extracted via simple mechanical operations.

In an embodiment of coordinated system 400 that comprises a plurality of conveyor systems 100 stacked along the Z-axis, chute 140 of at least one conveyor system 100 in each level of the stack may be associated with a down chute 500. For example, as illustrated in FIG. 5B, chute 140A of conveyor system 140A on a first level of the stack may be slightly above a down chute 500A along the Z-axis, chute 140B of conveyor system 140B on a second level of the stack may be slightly above a down chute 500B along the Z-axis, and a chute 140N of conveyor system 140N on an N-th level of the stack may be slightly above a down chute 500N along the Z-axis. Thus, items 130A on the first level of the stack may be moved (e.g., pushed or pulled) onto down chute 500A, items 130B on the second level of the stack may be moved onto down chute 500B, and items 130N on the N-th level of the stack may be moved onto down chute 500N. In each case, item 130, when moved onto a down chute 500, may slide with gravity to an end of down chute 500 and onto a destination surface (e.g., another conveyor system, a shipping container, etc.). In the illustrated embodiment, each level of the stack has a down chute 500. However, in an alternative embodiment, a single down chute 500 may be movable along the Z-axis to change the source and/or destination of the path, so as to service every level of the stack. Alternatively, instead of down chutes 500, items 130 may be moved out of a chute 140 directly onto a destination surface (e.g., another conveyor system).

In an embodiment, coordinated system 400 may comprise an elevator system that is designed to move items 130, along the Z-axis, to different levels of the stack. The elevator system may be provided in addition to or instead of down chutes 500. The elevator system may comprise an elevator surface that aligns with the top surface of a composite chute 440 at each level of the stack. Thus, the elevator system may move an item 130 to a particular level of the stack, and the item 130 may then be moved (e.g., pushed or pulled) into composite chute 440 for stowage in a merry-go-round conveyor system 100 at that level of the stack. Alternatively, the elevator system could be provided in place of a segment 122 in at least one chute 140 (e.g., in place of segment 122C1 in FIG. 1), such that the elevator surface is within the chute 140. In this case, each conveyor 120 along the Z-axis of the elevator system may comprise a hole in place of the segment 122, such that the elevator surface may move up and down through the holes. An item 130 in chute 140 at a given level of the stack may be moved (e.g., pushed or pulled) onto the elevator surface, while the elevator surface is at that level of the stack, and the elevator surface may then move along the Z-axis to transport the item 130 to a different level of the stack, where the item 130 can be moved into the chute 140 at that level of the stack. In any case, items 130 may be stocked into coordinated system 400, items 130 may be extracted from coordinated system 400, and/or items 130 may be moved between different levels of the stack of conveyor systems 100 in coordinated system 400, via the elevator system.

Figures 6, 7:
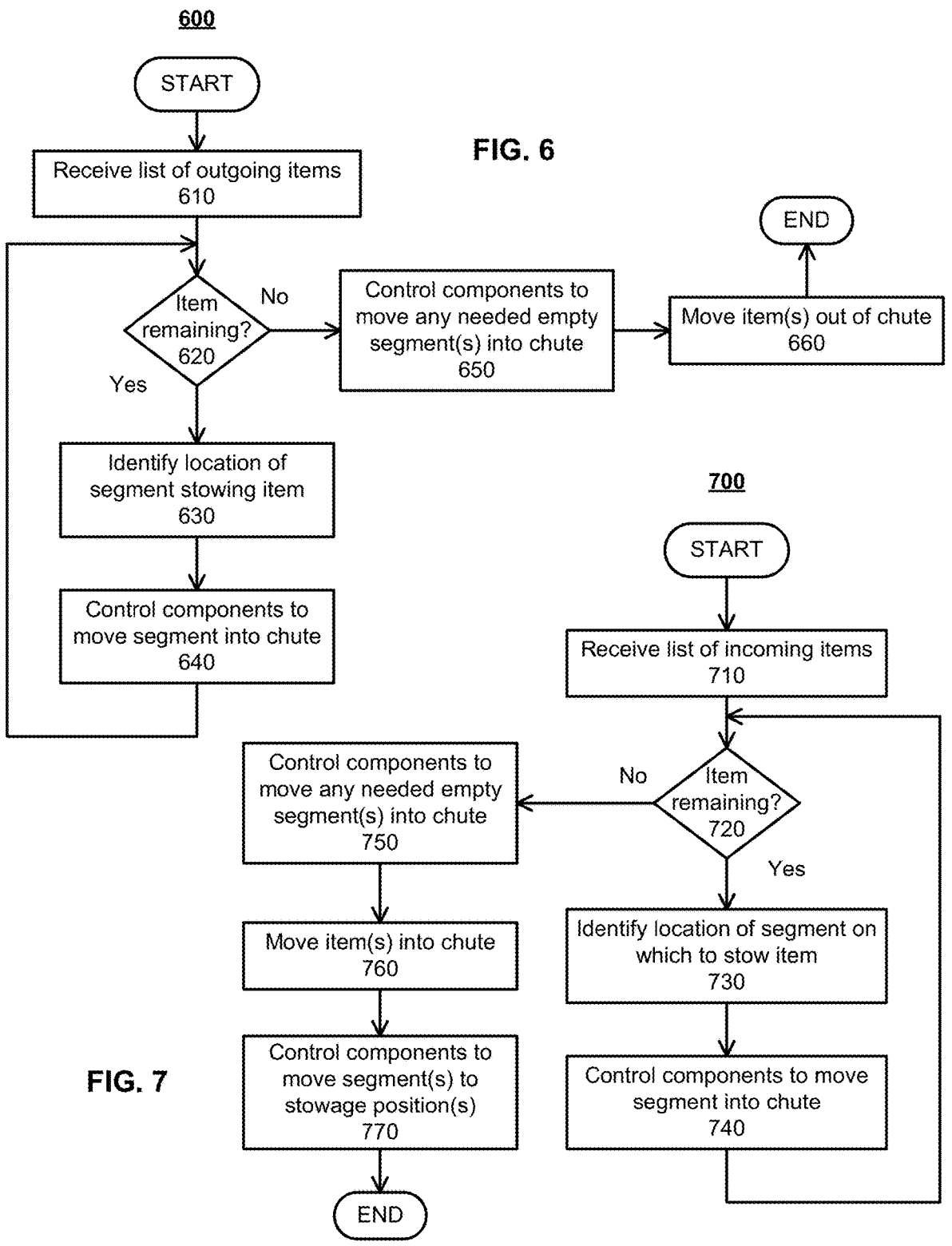
FIG. 6 illustrates a process for coordinating movement in merry-go-round conveyor systems to offload one or more items, according to an embodiment.
FIG. 7 illustrates a process for coordinating movement in merry-go-round conveyor systems to onload one or more items, according to an embodiment.

FIG. 6 illustrates a process 600 for coordinating movement in a merry-go-round conveyor system 100 to offload one or more items 130, according to an embodiment. Initially, in subprocess 610, a list of one or more outgoing items 130 may be received. For example, the list of item(s) 130 may be received from an automated system that automatically generates the list based on an order, a sorting algorithm, and/or the like. Alternatively, the list of item(s) 130 may be generated manually by a customer, operator, or other user. The list of item(s) 130 may be implemented as any type of data structure and may be received in any form, either simultaneously or with portions of the list (e.g., individual items 130 or groups of items 130) received at different times. In addition, the list of item(s) 130 could comprise a subset of a larger list of item(s) 130, such as a subset of item(s) 130 that are all stowed on different conveyors 120 in conveyor system 100, such that the subset of item(s) 130 can all be rotated into chute 140 at the same time.

Process 600 then iterates through subprocesses 630 and 640 for each item 130 in the list that was received in subprocess 610. It should be understood that the iterations may be performed serially or in parallel, and preferably in parallel whenever possible. If an item 130 remains to be considered (i.e., "Yes" in subprocess 620), an iteration of subprocesses 630 and 640 is performed for that item 130. Otherwise, if no items 130 remain to be considered (i.e., "No" in subprocess 620), process 600 proceeds to subprocess 650.

In subprocess 630, the location of segment 122, on which the current item 130 under consideration is stowed, is identified. In an embodiment, each item 130 that is stowed in conveyor system 100 is associated with a place-time identifier (PTID), as described in significant detail in the related applications. Each PTID identifies the location of the associated item 130, relative to one or more reference points, as well as the time at which the associated item 130 is at that location (e.g., a timestamp indicating when the associated item 130 arrived at the location and/or a timestamp indicating when the associated item 130 left the location). For example, each PTID may comprise a C-vector indicating a conveyor 120 on which the item 130 is stowed, an S-vector indicating a position (e.g., segment 122) on the conveyor 120 on which the item 130 is stowed, a G-vector indicating a position (e.g., coordinates) of the item 130 relative to a fixed reference point (e.g., on the ground), a T-vector indicating a time (e.g., timestamp) at which item 130 was stowed at its current location, and/or a W-vector representing attributes of the item 130, the item's location, the conveyor 120 and/or segment 122 on which the item is stowed, and/or the like. PTIDs enable items 130 to be tracked throughout conveyor system 100, as well as an overarching coordinated system 400, over multiple dimensions, including location and time. In subprocess 630, the PTID, which is associated with the current item 130 under consideration, may be retrieved, and the segment 122 on which the current item 130 under consideration is stowed may be easily identified from the PTID (e.g., from the C-vector and S-vector). The PTID may be retrieved by using an identifier of the current item 130 under consideration as an index into a relational database that associates items 130 with PTIDs.

In subprocess 640, one or more components of conveyor system 100 are controlled to move the segment 122, which is stowing the current item 130 under consideration, from the location, identified in subprocess 630, into chute 140. For example, a control system may determine whether to rotate the conveyor 120 comprising the segment 122 in a clockwise or counterclockwise direction (e.g., based on which direction requires the least amount of rotation). Then, the control system may drive the motor of the conveyor 120 to rotate the conveyor 120 in the determined direction, until the segment 122 is positioned within chute 140 (e.g., at an indexed position).

Over one or more iterations, all item(s) 130 in the list are rotated into chute 140 by rotating the respective segments 122, stowing those item(s) 130, into chute 140. In subprocess 650, one or more components of conveyor system 100 may be controlled to move empty segments 122 into chute 140, if needed. Although subprocess 650 is illustrated as occurring after all iteration(s) of process 640 have been performed, subprocess 650 may be performed before or in parallel with any iteration(s) of subprocess 640. In a preferred embodiment, all conveyors 120 may be rotated in parallel in subprocesses 640 and 650 to move their respective segments 122 into chute 140 at the same time.

In an embodiment, at least one empty segment 122, and preferably a pair of empty segments 122 on opposite sides of each conveyor 120 when chute 140 extends across the entire conveyor system 100, may be maintained in every conveyor 120 of conveyor system 100. These empty segments 122 enable any number of items 130 to be simultaneously moved into and out of chute 140, up to the total number of conveyors 120. For instance, if a merry-go-round conveyor system 100 consists of five conveyors 120, one, two, three, four, or five items 130 may be moved into or out of chute 140 at once. In this case, if fewer than five items 130 are moved into chute 140, the rest of the conveyors 120 (i.e., conveyors 120 which are not stowing items to be moved into chute 140) may rotate an empty segment 122 into chute 140, so that the items 130 within chute 140 may be moved as a single group without having to avoid items 130 that are not part of that group.

As an example, assume that the list of items 130, received in subprocess 610 consists of items 130B and 130C in FIG. 1. In this case, conveyor 120B may be rotated in an iteration of subprocess 640 to move segment 122B3 into chute 140. Simultaneously or contemporaneously, conveyor 120C may be rotated in another iteration of subprocess 640 to move segment 122C14 into chute 140. Simultaneously or contemporaneously, conveyor 120A may be rotated in an iteration of subprocess 650 to move an empty segment 122 into chute 140.

It should be understood that, if any empty segment (e.g., 122A1) is already in chute 140, subprocess 650 may be skipped. In addition, if no empty segments are needed (e.g., the list included items 130 from every conveyor 120), subprocess 650 may be skipped.

In subprocess 660, all item(s) 130 in chute 140 may be moved out of chute 140 in a single sweep or other operation. For example, a robotic pusher may push item(s) 130 out of chute 140, from an interior of central component 110. Alternatively, a robotic picker may pull item(s) 130 out of chute 140, from an exterior of system 100. In an embodiment that utilizes PTIDs, the PTIDs of all of items 130 in chute 140 may be updated at once after all items 130 have been moved out of chute 140, without having to process the PTID of each item 130 as that item 130 moves across conveyors 120 in chute 140.

FIG. 7 illustrates a process 700 for coordinating movement in a merry-go-round conveyor system 100 to onload one or more items 130, according to an embodiment. Initially, in subprocess 710, a list of one or more incoming items 130 may be received. For example, the list of item(s) 130 may be received from an automated system that automatically generates the list based on a stowage decision, sorting algorithm, and/or the like. Alternatively, the list of item(s) 130 may be generated manually by a customer, operator, or other user. The list of item(s) 130 may be implemented as any type of data structure and may be received in any form, either simultaneously or with portions of the list (e.g., individual items 130 or groups of items 130) received at different times.

Process 700 then iterates through subprocesses 730 and 740 for each item 130 in the list that was received in subprocess 710. It should be understood that the iterations may be performed serially or in parallel, and preferably in parallel whenever possible. If an item 130 remains to be considered (i.e., "Yes" in subprocess 720), an iteration of subprocesses 730 and 740 is performed for that item 130. Otherwise, if no items 130 remain to be considered (i.e., "No" in subprocess 720), process 700 proceeds to subprocess 750.

In subprocess 730, the location of segment 122, on which the current item 130 under consideration is to be stowed, is identified. In an embodiment, a control system of conveyor system 100 may determine on which segment 122 of which conveyor 120 to store each item 130. Alternatively, a control system of coordinated system 400 may determine on which segment 122 of which conveyor 120 in which conveyor system 100 to store each item 130. In an embodiment in which only a single item 130 is stored on each segment 122, the identified segment 122 may be empty or emptied before stowing the current item 130 under consideration. In an alternative embodiment in which a plurality of items 130 may be stored on a single segment 120, the identified segment 122 may not necessarily be empty. For example, item 130 may be fungible and the identified segment 122 may comprise other instances of the same fungible item 130.

In subprocess 740, one or more components of conveyor system 100 are controlled to move the segment 122, which is to stow the current item 130 under consideration, from the location, identified in subprocess 730, into chute 140. Subprocess 740 may be identical or similar to subprocess 640. Thus, any description of subprocess 640 applies equally to subprocess 740, and therefore, will not be redundantly included herein.

Over one or more iterations, all segments 122, which will be used to stow the item(s) 130 in the list received in subprocess 710, are rotated into chute 140. In subprocess 750, one or more components of merry-go-round conveyor system 100 may be controlled to move empty segments 122 into chute 140, if needed. Although subprocess 750 is illustrated as occurring after all iteration(s) of process 740 have been performed, subprocess 750 may be performed before or in parallel with any iteration(s) of subprocess 740. In a preferred embodiment, all conveyors 120 may be rotated in parallel in subprocesses 740 and 750 to move their respective segments 122 into chute 140. Subprocess 750 may be identical or similar to subprocess 650. Thus, any description of subprocess 650 applies equally to subprocess 750, and therefore, will not be redundantly included herein.

In subprocess 760, all item(s) 130 may be moved into chute 140 from an external environment in a single sweep or other operation. For example, a robotic pusher may push item(s) 130 into chute 140, from the exterior environment. Alternatively, a robotic picker may pull item(s) 130 into chute 140, from an interior of central component 110. It should be understood that external environment may comprise the chute 140 of an adjacent conveyor system 100 in a coordinated system 400. Alternatively, the external environment could comprise another system or environment. For instance, a customer, operator, or other user, could manually load item(s) 130 into chute 140 in subprocess 760.

In subprocess 770, one or more components of merry-go-round conveyor system 100 are controlled to move the segments 122, within chute 140 and onto which item(s) 130 have been moved, to their respective stowage positions. For example, conveyors 120, onto which item(s) 130 have been moved, may be rotated to position the segments 122, onto which item(s) 130 have been stowed, out of chute 140 to their determined stowage positions. In an embodiment which utilizes PTIDs, the PTID of each item 130 may also be updated to reflect the current time and the new location.

Each of processes 600 and 700 may be executed by a control system of each conveyor system 100 or by a control system of coordinated system 400. The control system may be electrically connected to a motor that independently drives each conveyor 120 of conveyor system 100. In an embodiment, each conveyor 120 may comprise a circular disk that is rotated by a rack and pinion mechanism, driven by a stepper, servo motor, Geneva drive, or the like. The circular disk may be made from rubber (e.g., as a circular belt), polyurethane, polyvinyl chloride, silicone, thermoplastics, metal, fabric, leather, and/or any other suitable material. Such an embodiment provides high system reliability, since stepper and servo motors have simple structures, and are very rugged, powerful, and reliable, with very few failures. Stepper and servo motors can also provide full control of linear motion (e.g., clockwise and counterclockwise rotation) and speed, to allow a processor to precisely control stopping, starting, and movement of conveyor 120. In an alternative embodiment, electromagnetic propulsion may be used.

Each conveyor 120 may rotate on a fixed base and be driven (e.g., on a track) by separate or on-board motor(s) or other drive system(s). As discussed elsewhere herein, each conveyor 120 may rotate independently from any other conveyor 120 in conveyor system 100, and any conveyor system 100 may be operated independently from any other conveyor system 100 in coordinated system 400. The control system of a conveyor system 100 may be programmed to coordinate movements of conveyors 120 in the conveyor system 100. Similarly, the control system of coordinated system 400 may be programmed to coordinate operations in conveyor systems 100 to perform complex logistics in a wide variety of applications.

Each conveyor 120 may be configured to hold items 130 of any size, shape, and type. In some implementations, the same conveyor 120 may be configured to hold items 130 of different sizes, shapes, and/or types. In other implementations, each conveyor 120 is configured to hold items of the same size, shape, and/or type.

Figure 8:
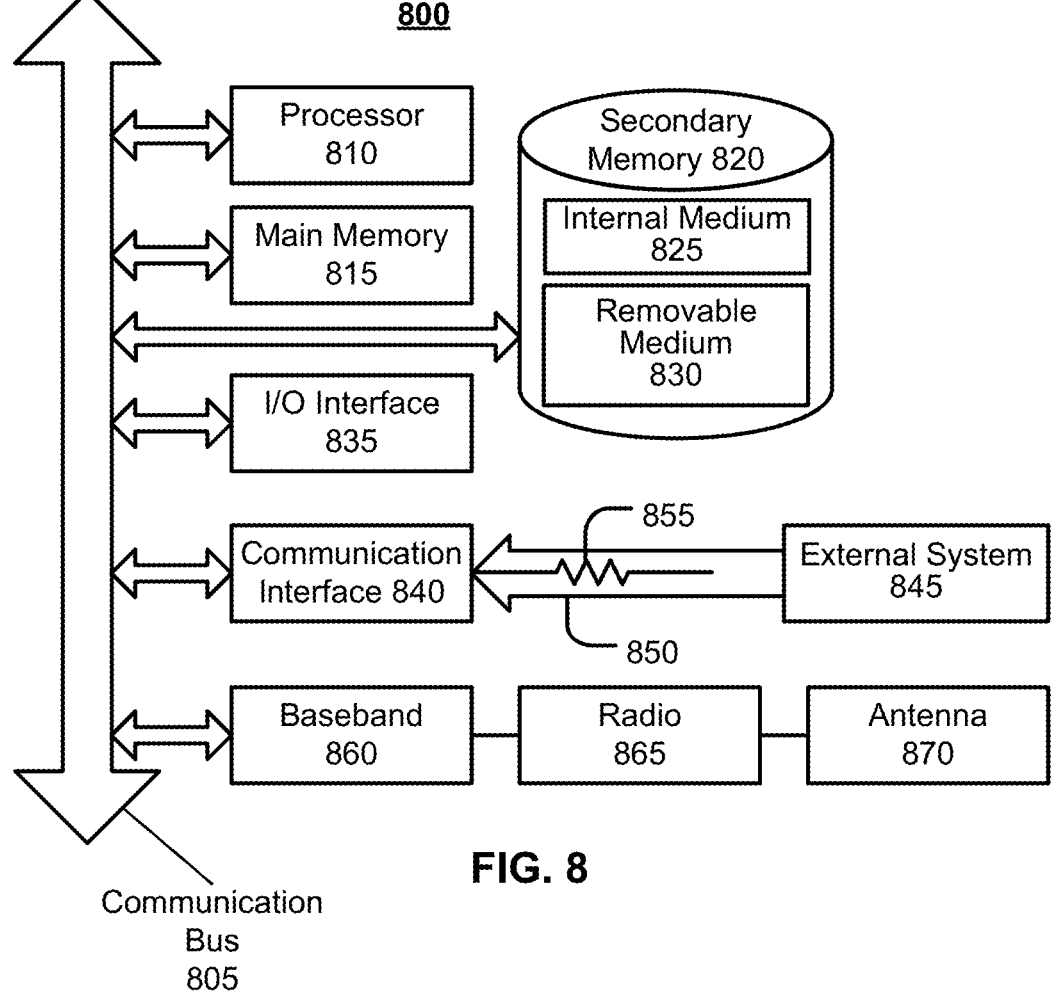
FIG. 8 illustrates an example processing system, by which one or more of the processes described herein, may be executed, according to an embodiment.

FIG. 8 illustrates an example processing system 800, by which one or more of the processes described herein, may be executed, according to an embodiment. For example, the control system of conveyor system 100 or the control system of coordinated system 400 may comprise or consist of processing system 800. Thus, system 800 may also be referred to herein as a "control system." System 800 can be a server, conventional personal computer, or any other processor-enabled device. Other computer systems and/or architectures may be also used, as will be clear to those skilled in the art.

System 800 comprises one or more processors 810. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor that is subordinate to the main processing system (e.g., back-end processor), an additional microprocessor or controller for dual or multiple processor systems, and/or a coprocessor. Such auxiliary processors may be discrete processors or may be integrated with a main processor 810. Examples of processors which may be used with system 800 include, without limitation, the Pentium® processor, Core i7® processor, and Xeon® processor, all of which are available from Intel Corporation of Santa Clara, California.

Processor 810 is preferably connected to a communication bus 805. Communication bus 805 may include a data channel for facilitating information transfer between storage and other peripheral components of system 800. Furthermore, communication bus 805 may provide a set of signals used for communication with processor 810, including a data bus, address bus, and/or control bus (not shown). Communication bus 805 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 800 may comprise a main memory 815. Main memory 815 provides storage of instructions and data for programs executing on processor 810, such as one or more of the functions and/or modules discussed herein. It should be understood that programs stored in the memory and executed by processor 810 may be written and/or compiled according to any suitable language, including without limitation C/C++, Java, JavaScript, Perl, Visual Basic, NET, and the like. Main memory 815 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 800 may comprise secondary memory 820. Secondary memory 820 may optionally include an internal medium 825 and/or a removable medium 830. Removable medium 830 is read from and/or written to in any well-known manner. Removable storage medium 830 may be, for example, a magnetic tape drive, a compact disc (CD) drive, a digital versatile disc (DVD) drive, other optical drive, a flash memory drive, and/or the like.

Secondary memory 820 is a non-transitory computer-readable medium having computer-executable code (e.g., disclosed software) and/or other data stored thereon. The computer software or data stored on secondary memory 820 is read into main memory 815 for execution by processor 810. In this description, the term "non-transitory computer-readable medium" is used to refer to any non-transitory computer-readable storage media used to provide computer-executable code and/or other data to or within system 800. Examples of such media include main memory 815, secondary memory 820 (including internal memory 825 and/or removable medium 830), and any peripheral device communicatively coupled with system 800. These non-transitory computer-readable media are means for providing executable code, programming instructions, software, and/or other data to system 800.

System 800 may comprise an input/output (I/O) interface 835. I/O interface 835 provides an interface between one or more components of system 800 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 800 may provide a graphical user interface via I/O interface 835. The graphical user interface may comprise, for example, one or more screens generated in HyperText Markup Language (HTML) or other language. These screens may be served in the form of a wizard, in which case two or more screens may be served in a sequential manner, and one or more of the sequential screens may depend on an interaction of the user with one or more preceding screens. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in memory that is locally (e.g., main memory 815 and/or secondary memory 820) and/or remotely accessible to system 800.

System 800 may comprise a communication interface 840. Communication interface 840 may allow data and other software to be transferred between system 800 and external devices (e.g. printers), networks, or other information sources. For example, executable code may be transferred to system 800 from a network server (e.g., external system 845) via communication interface 840. Examples of communication interface 840 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 800 with a network or another computing device. Communication interface 840 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software, including computer-executable code and/or data, transferred via communication interface 840 is generally in the form of electrical communication signals 855. These signals 855 may be provided to communication interface 840 via a communication channel 850. In an embodiment, communication channel 850 may be a wired or wireless network, or any variety of other communication links. Communication channel 850 carries signals 855 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, including one or more software modules) is stored in main memory 815 and/or secondary memory 820. Computer programs can also be received via communication interface 840 and stored in main memory 815 and/or secondary memory 820. Such computer programs, when executed by processor(s) 810, enable system 800 to perform the various processes and functions described elsewhere herein.

System 800 may also include optional wireless communication components that facilitate wireless communication over a voice network and/or a data network. The wireless communication components comprise an antenna system 870, a radio system 865, and a baseband system 860. In system 800, radio frequency (RF) signals are transmitted and received over the air by antenna system 870 under the management of radio system 865. Baseband system 860 is communicatively coupled with processor 810, which may be a central processing unit (CPU).

In an embodiment, antenna system 870 may comprise one or more antennae and one or more multiplexors (not shown) that perform a switching function to provide antenna system 870 with transmit and receive signal paths. In the receive path, received RF signals can be coupled from a multiplexor to a low noise amplifier (not shown) that amplifies the received RF signal and sends the amplified signal to radio system 865.

In an alternative embodiment, radio system 865 may comprise one or more radios that are configured to communicate over various frequencies. In an embodiment, radio system 865 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 865 to baseband system 860.

In an embodiment, system 800 controls one or more motors that drive one or more conveyors 120. For example, system 800 may drive an actuator of a motor to activate and deactivate the motor, change the direction of movement of the motor, change the speed of the motor, and/or the like. A coordinated system 400 may comprise a separate system 800 for each conveyor 120, for each conveyor system 100, and/or for the entire coordinated system 400. In an automated system comprising a plurality of systems 800, the systems 800 may be hierarchically arranged, for example, with one primary control system 800 (e.g., controlling the entire coordinated system 400) managing the operations of two or more subordinate control systems 800 (e.g., controlling the plurality of conveyor systems 100).

System 800 may also communicate with one or more other systems that are external to the automated system. System 800 may communicate with these external system(s) 845, for example, via an application programming interface (API) and/or over at least one network. System 800 may receive instructions from external system 845, and provide data to external system 845. It should be understood that conveyance system 100 may be made compatible with and/or interfaced with any external system 845 (e.g., via wired and/or wireless communication and an API). Examples of such external systems 845 include, without limitation, ordering systems (e.g., web-based store), laboratory information systems (LIS), remote operating systems, dashboard systems, quality control systems, alarm systems, inventory management systems (e.g., which manage items 130 and may perform automatic reordering), and/or the like. For example, control system 800 may communicate with an automated external system 845 that receives orders from customers or other users (e.g., via a graphical user interface).

System 800 may manage one or more database tables (e.g., in secondary memory 820) that store information about each item 130 stowed in conveyor system 100 or coordinated system 400, such that each item 130 can be picked by name, stock keeping unit (SKU), and/or other properties or characteristics. In addition, system 800 may utilize one or more of these properties to determine how to stow, move, and/or otherwise manage items 130. For example, system 800 can use such information to make automatic determinations, such as the brand or version of item 130 being requested, selection of items 130 closer to becoming outdated or expired for picking, detecting the most popular items 130, detecting out-of-stock or low-inventory items 130 (e.g., to ration those items 120 as much as possible, and/or order more of those items 120), selecting substitutions for out-of-stock items 130 (e.g., based on artificial intelligence, such as a machine-learning algorithm), moving expired or recalled items 130 to a destination out of coordinated system 400 (e.g., disposal container), and/or the like.

System 800 may store and execute one or more software modules (e.g., stored in main memory 815 and/or secondary memory 820, and executed by processor(s) 810) that control conveyor system 100 or coordinated system 400. This control may comprise optimizing the timing of movements of conveyors 120 relative to each other and operations being performed (e.g., minimizing dwell time and increasing throughput), implementing required lead times for processing, selecting items 130 for processing (e.g., sorting), bringing together a collection of items 130 in chute 140 (e.g., according to process 600), stowing incoming items 130 (e.g., according to process 700), moving items 130 across a composite chute 440, recording PTIDs of items 130, and/or the like.

In an embodiment, the control software may utilize artificial intelligence to anticipate the intentions of an external system 845 and/or human users. For example, a machine-learning algorithm may be trained to predict the next operation to be performed based on an observed series of events, using historical datasets that have been observed and stored. The trained machine-learning algorithm may then be applied by the control software to observed events, in order to select the next operation in real time.

Notably, the same control software can be used by a coordinated system 400, regardless of the size of coordinated system 400 and/or conveyor system 100. Thus, coordinated system 400 can be scaled up or down as needed or desired for a particular application, without having to develop new software. For example, a coordinated system 400 may be produced in a small, medium, and/or large version. Regardless of the size of coordinated system 400, the software can optimize operation of coordinated system 400 and analyze the data produced by coordinated system 400 in the same manner.

In an embodiment, the control software may also optimize operations for scheduled operations. For example, if a plurality of operations are scheduled for a given time and each operation requires certain preparations before the operation can be initiated, the control software, executed by control system 800, may prioritize the preparations according to lead time. Thus, preparations for the operation with the longest lead time may be given the highest priority and be performed first, whereas the operation with the shortest lead time may be given the lowest priority and be performed last.

The control software may also be sensitive to historical time-of-day loads. For example, the control software may store historical usage data for coordinated system 400, and use that historical usage data to anticipate upcoming needs. If certain items 130 are regularly operated upon at a certain time on a certain day, the control software, executed by control system 800, may automatically begin preparations for such operations (e.g., moving and/or re-sorting items) with sufficient lead time, such that the preparations will be completed at approximately the particular time on the particular day at which the operations are regularly performed.

In an embodiment, the chute mechanism for moving items 130 radially along chute 140, whether a pusher or a puller mechanism, may anticipate its next operation. When not in motion, the chute mechanism may be positioned, along chute 140, directly above seams between adjacent conveyors 120 (e.g., in gaps 315), above seams between adjacent conveyor systems 100, within central component 110, and/or the like. Thus, the chute mechanism does not get in the way of items 130 rotating through chute 140, as those items 130 move circumferentially on conveyors 120.

Advantageously, the use of conveyors 120 eliminates the extremely elaborate navigation schemata and collision avoidance required by robotic vehicles. All transfers along a chute 140 can be performed by a simple push or pull, and are agnostic to the size, weight, shape, or other dimensions of items 130, and do not require expensive intelligent camera systems to identify items 130 being transferred. In addition, conveyors 120 are much safer than robotic vehicles, since humans can work safely right next to conveyors 120.

However, humans are no longer needed for picking items. This means that conveyor systems 100 can be stacked much higher, since they do not need to be accessible to humans, thereby reducing required warehouse square footage by more than 50%. In addition, the motors, driving conveyors 120, do not have to be on board a mobile object, thereby eliminating the need to charge any batteries.

As discussed throughout, the movements of conveyors 120 may be coordinated under the control of control system 800. However, because conveyors 120 are independently controllable, each conveyor 120 may also be rotated on its own in both directions, and independently stopped and started. This enables random access to any portion on any conveyor 120, including any item 130 or set of contiguous items 130 that may be held by that portion. For example, in response to an instruction that identifies an item 130 to be accessed (e.g., issued by another component or system, an operator via a graphical user interface, etc.), control system 800 may determine the location of the item 130 on a conveyor 120 (e.g., by mapping an identifier of the item 130 to a PTID, as discussed elsewhere herein), and move the conveyor 120 so that the segment 122 on which the item 130 is stowed is within chute 140. As another example, in response to an instruction that identifies a segment 122 of a conveyor 120 to be accessed (e.g., issued by another component or system, an operator via a graphical user interface, etc.), control system 800 may determine the location of the segment 122, and move the conveyor 110 so that the segment 122 is within chute 140. In this manner, an item 130 can be stowed on or retrieved from conveyor 120, and/or any segment 122 of conveyor 120 can be accessed.

Advantageously, since the automated movements in each conveyor system 100 are short and direct and implemented by the same mechanism (e.g., indexing and movement of conveyors 120), the automated system may utilize a minimalistic and inexpensive design. For example, all movements of conveyor 120 may be performed by the same, easily controllable mechanisms (e.g., a drive, which may comprise a stepper or servo motor, Geneva drive, etc., driving a rack and pinion system, electromagnetic propulsion, etc.), and are often direct, one-dimensional, quick, and short. This can eliminate the complex robotic mechanisms employed by current, expensive systems, while increasing throughput rate.

In an embodiment, one or more of conveyors 120 may be temperature-controlled. In such an embodiment, the temperature of the top surface of individual segments 122 or the entire conveyor 120 may be controlled using, for example, thermoelectric heating and/or cooling. Different segments 122 of the same conveyor 120 and/or different conveyors 120 of the same conveyor system 100 may be individually controlled, for example, to be different temperatures than each other. Alternatively or additionally, portions of an enclosure around conveyors 120 of a conveyor system 100 may be temperature-controlled (e.g., ambient cold or hot air in a tunnel). In such an embodiment, control system 800 may move one or more segments 122 of one or more conveyors 120 into these temperature-controlled portions, to control the temperature of items 130 stowed on those segments 122. In either case, the temperature of the temperature-controlled segments 122, conveyors 120, or enclosure may be adjusted under control of control system 800. For example, items 130 which need to be refrigerated or remain frozen may be stored on segments 122 or conveyors 120 which are cooled to an appropriate temperature. Similarly, items 120 which need to be heated may be stored on segments 122 or conveyors 120 which are heated to an appropriate temperature.

A coordinated system 400, comprising one or a plurality of conveyors 100, may be utilized in any number of different applications. Coordinated system 400 may have both a stowage function and a conveyance function. Each chute 140 may represent a virtual tote bin that allows one or more items 130 to be collected into a single unit for stowage or conveyance, but without requiring actual, labor-intensive, human-drawn tote bins.

Coordinated system 400 may autonomously sort items 130 stowed on the plurality of conveyor systems 100. Using chutes 140 and/or composite chutes 440, control system 800 of coordinated system 400 may autonomously move any item 130 from one segment 122 to any other segment 122 within coordinated system 400. This may involve moving an item 130 from a first segment 122 on a first conveyor 120 in a first conveyor system 100 to a second segment 122 on the same first conveyor 120 (e.g., using chute 140 of the first conveyor system 100), to a second segment 122 on a second conveyor 120 of the same first conveyor system 100 (e.g., using chute 140 of the first conveyor system 100), or to a second segment 122 on a second conveyor 120 of a second conveyor system 100 within the same coordinated system 400 (e.g., using one or more composite chutes 440 between the first and second conveyor systems 100). For example, in order to move an item 130 from a first segment 122 to a second segment 122 on the same conveyor 120, the first segment 122 and an empty segment 122 on an adjacent conveyor 120 may be rotated into chute 140, the item 130 may be pushed or pulled from the first segment 122 onto the empty segment 122, the second segment may be rotated into chute 140 (thereby rotating the first segment 122 out of chute 140), and the item 130 may be pushed or pulled from the empty segment 122 onto the second segment 122. Coordinated system 400 may perform autonomous sorting of items 130, in the background, while performing other functions (e.g., stocking, order fulfillment, etc.), to optimize the stowage locations of items 130 for future retrieval (e.g., for order fulfillment). This also keeps the inventory of items 130 in order and provides precise, real-time inventory control.

A conveyor system 100 and coordinated system 400 may be constructed at any scale and at whatever scale is appropriate for a given application. Segments 122 may be small and chute 140 may be narrow to accommodate small items 130, or segments 122 may be large and chute 140 may be wide to accommodate large items 130 (e.g., pallets). A coordinated system 400 may comprise conveyor systems 100 of different sizes to accommodate items 130 of varying sizes. Conveyor systems 100 may be stacked into a plurality of levels in coordinated system 400, as discussed elsewhere herein, to form towers, which enables very dense storage of items 130. Coordinated system 400 can be scaled from a small household pantry with one or a few such towers, to a large industrial warehouse with hundreds or thousands of such towers. However, even on a massive scale, items 130 can be moved, via rotation of conveyors 120 and push and/or pull operations through composite chutes 440, to one or any one of a plurality of convenient destinations (e.g., ports), where it can be picked up by a human, manually or auto-matically moved into a shipping container, moved into another conveyance system, and/or the like.

Figure 9:
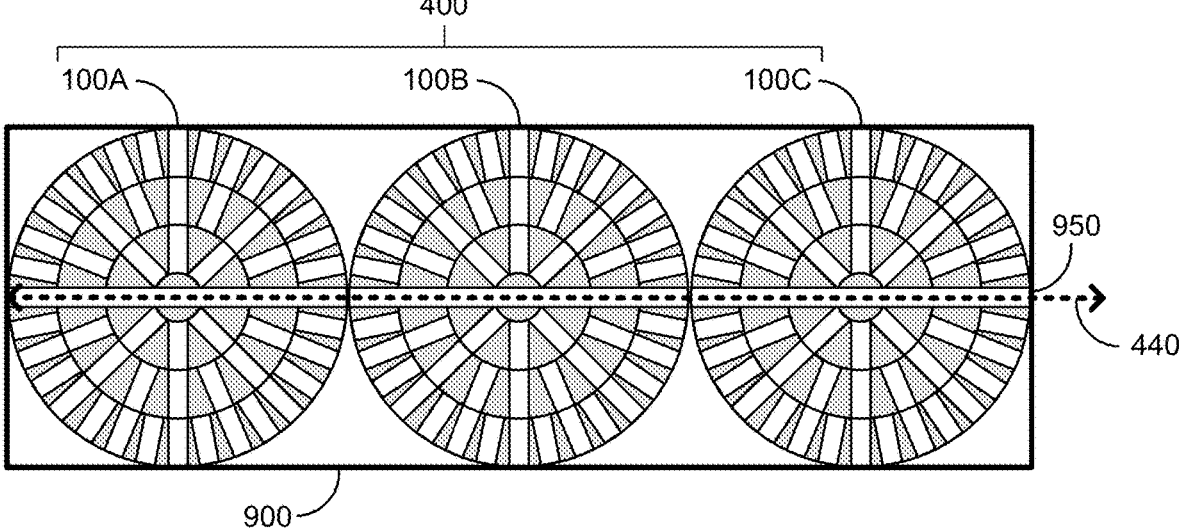
FIG. 9 illustrates an enclosure with a coordinated system, according to an embodiment.

FIG. 9 illustrates an enclosure 900 that contains a coordinated system 400, according to an embodiment. Enclosure 900 may be the back of a delivery van or other vehicle, the trailer of a tractor trailer, a shipping container, the storage hold of an aircraft, an autonomous brick-and-mortar store, or the like. Coordinated system 400 may be installed in enclosure 900, such that a composite chute 440 can be formed along the longitudinal axis of enclosure 900. While three conveyor systems 100A, 100B, and 100C are illustrated, it should be understood that enclosure 900 may contain any number of conveyor systems 100, including one or more towers with multiple levels of conveyor systems 100.

Enclosure 900 may comprise an inlet/outlet port 950 that is aligned with composite chute 440. A stocker or other user may load items 130 into coordinated system 400 by placing one or more items 130 through port 950 into composite chute 440 (e.g., on an outer segment 122 of an outermost conveyor 120 of conveyor system 100C). Automatically or in response to a user operation, control system 800 of coordinated system 400 may control one or more conveyors 120 of one or more conveyor systems 100 and/or one or more chute mechanisms, according to process 600, to move each item 130 from the portion of composite chute 440 near port 950 to a segment 122 in the interior of coordinated system 400. In addition, control system 800 may associate each item 130 with a PTID, representing the stowage location of the item 130 within coordinated system 400.

Furthermore, a delivery person or other user may operate coordinated system 400 to extract one or more items 130 from coordinated system 400. For example, the user may specify a list of one or more items 130, via a user interface of coordinated system 400. In response, control system 800 of coordinated system 400 may control one or more conveyors 120 of one or more systems 100 and/or one or more chute mechanisms, according to process 700, to move each item 130 from a segment 122 in the interior of coordinated system 400 into the portion of composite chute 440 near port 950. The user may then pick up the item(s) 130 through port 950 for additional processing (e.g., delivery).

In an embodiment, control system 800 of coordinated system 400 could be communicatively coupled to a routing system or otherwise have access to information about the route being traversed by the delivery vehicle, comprising enclosure 900, and the item(s) 130 to be delivered at each stop in the route. Control system 800 could also receive real-time location information (e.g., geographical coordinates of a Global Navigation Satellite System (GNSS), such as the Global Positioning System (GPS)). In this case, control system 800 may track the location of the delivery vehicle along the route and prepare the item(s) 130 to be delivered at each stop, in advance of each stop (i.e., during the time between the last stop and the next stop), by controlling coordinated system 400 to move item(s) 130 into composite chute 440 near port 950. Thus, at each stop, the delivery person simply needs to walk to port 950, retrieve item(s) 130 from port 950, and deliver them to the recipient's door.

As an alternative to a port 950, an entire side or circumference of the outermost conveyor 120 of at least one conveyor system 100 may be open to the external environment. In this case, a stocker may simply place an item 130 to be stowed in coordinated system 400 on an open segment 122 of this outermost conveyor 120. The item 130 may be scanned prior to or after placement on the open segment 122 to establish a PTID for item 130. Similarly, a picker (e.g., delivery person, customer, etc.) may pick an item 130 off of a segment 122 of this outermost conveyor 120. The item 130 may be scanned prior to or after picking item 130 off of segment 122 to record the fact that item 130 has been removed from coordinated system 400.

As another example, enclosure 900 may be an automated store. In this case, a customer or other user may place an order via a graphical user interface provided by control system 800 of coordinated system 400. The user may place the order by selecting item(s) 130 from an inventory of all items 130 stowed in coordinated system 400, and then paying for the order via any suitable payment mechanism. Control system 800 may then implement process 600 to move all item(s) 130 in the order into composite chute 440 near port 950. Port 950 may initially be locked, so that unauthorized users are not able to reach in and grab items 130. When the order is ready, and optionally in response to a user authentication mechanism, port 950 may unlock, so that the customer can retrieve the item(s) 130 in the order.

As another example, enclosure 900 may be a warehouse for order fulfillment. In this case, a customer or other user may place an order via an online marketplace. The user may place the order by selecting item(s) 130 from items 130 that are sold via the online marketplace, and then paying for the order via any suitable payment mechanism. The online marketplace, as an external system 845, may send the list of item(s) 130, representing the order, to control system 800 of coordinated system 400. For example, the online marketplace may push the order to control system 800 via an API of control system 800, or control system 800 may pull the order from the online marketplace via an API of the online marketplace. Control system 800 may then implement process 600 to earmark all item(s) 130 in the order, and move all of the earmarked item(s) 130 into composite chute 440. The item(s) 130 in composite chute 440 may then be moved (e.g., pushed or pulled) out of composite chute 440 (e.g., via a down chute 500) directly into a shipping container, onto another conveyor system (e.g., outer transport conveyor), or other destination.

The disclosed embodiments of conveyor system 100 are generally illustrated and described herein as having circular conveyors 120. However, in an alternative embodiment, conveyor system 100 could comprise or consist of a plurality of linear conveyors 120 that are parallel, rather than nested. In every other respect, a conveyor system 100 with parallel linear conveyors 120 may be the same as or similar to the conveyor system 100 with nested circular conveyors 120. For example, parallel linear conveyors 120 may be divided into segments 122 (e.g., but without the necessity of spaces 124), the location of items 130 may be tracked using PTIDs, a chute 140 may extend orthogonally across the parallel linear conveyors 120, parallel linear conveyors 120 may be configured to only stop at indexed positions, processes 600 and 700 may be used to control the conveyor system 100, conveyor system 100 may be housed in an enclosure 900, and/or the like. Thus, any description herein of merry-go-round conveyor system 100 may be equally applied or adapted to a conveyor system 100 with parallel linear conveyors 120.

Figure 10A:
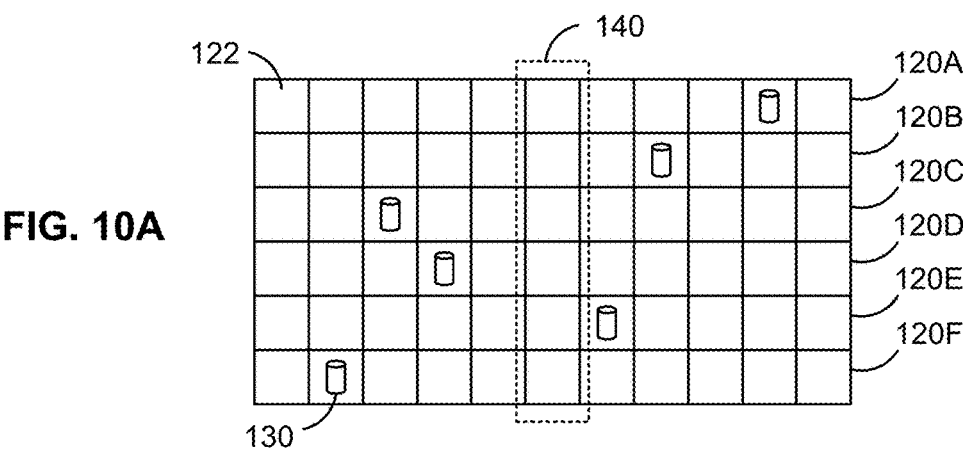
FIGS. 10A and 10B illustrate a top-down view of a conveyor system, with parallel linear conveyors, according to an embodiment.
Figure 10B:
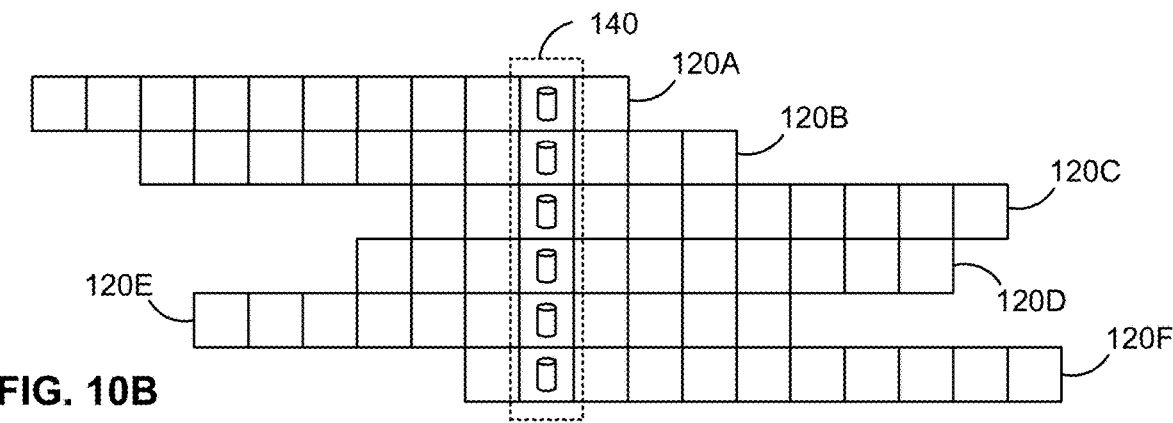

FIGS. 10A and 10B illustrate a top-down view of a conveyor system 100, with parallel linear conveyors 120, according to this alternative embodiment. As illustrated, conveyor system 100 may comprise a plurality of linear conveyors 120, illustrated as conveyors 120A, 120B, 120C, 120D, 120E, and 120F. Each conveyor 120 is parallel to every other conveyor 120 and abuts at least one other conveyor 120. In particular, each outer conveyor 120A and

120F abuts a single (e.g., conveyor 120B and 120E, respectively), whereas each inner conveyor 120B, 120C, 120D, and 120E abuts two conveyors on either side. Each conveyor 120 comprises a plurality of segments 122 that are configured to hold at least one item 130 on the top surface.

Conveyor system 100 comprises at least one chute 140 that extends orthogonally across all of conveyors 120. Each conveyor 120 may be configured to slide on a track (e.g., ball race track). The track may be longer than the conveyor 120, such that each segment 122, from end to end of conveyor 120, is able to be slid into chute 140. While only a single chute 140 is illustrated, conveyor system 100 may consist of one or any plurality of chutes 140. A plurality of chutes 140 (e.g., three chutes 140) may enable the amount of floor that is taken up by the track to be reduced for each conveyor 120, since not as much track will be required to ensure that every segment 122 can be moved to at least one chute 140.

As illustrated in FIG. 10B, any set of items 130, stowed across different conveyors 120, may be aligned in chute 140 by moving conveyors 120, such that the segment 122 holding each item 130 is within chute 140. As discussed elsewhere herein, all of the items 130 in chute 140 may be moved (e.g., pushed or pulled) out of chute 140 in a single operation.

As discussed elsewhere herein, a plurality of conveyor systems 100 may be stacked along a Z-axis in towers of a coordinated system 400. Additionally or alternatively, a plurality of conveyor systems 100, potentially including towers of conveyor systems 100, may be distributed in an X-Y plane. In this case, chutes 140 of different conveyor systems 100 may be aligned along at least one axis, such that a composite chute 440 may be formed across a plurality of adjacent conveyor systems 100.

Figure 11:
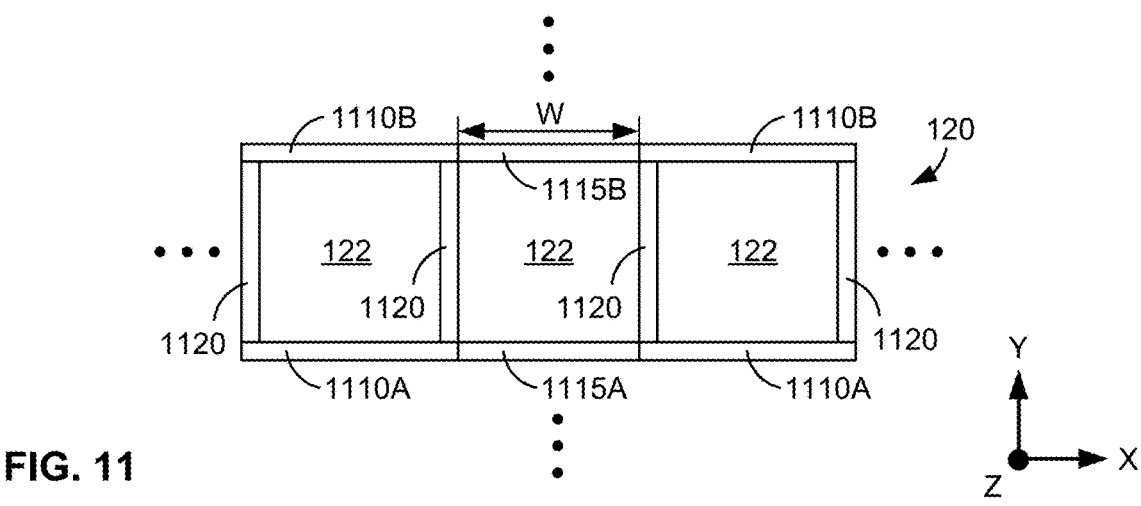
FIG. 11 illustrates segments of a conveyor system, with parallel linear conveyors, according to an embodiment.

FIG. 11 illustrates segments 122 of a conveyor system 100, according to the embodiment which utilizes parallel linear conveyors 120. Each conveyor 120 may be bordered on both of its longitudinal sides (i.e., extending along the X-axis), by a longitudinal wall 1110. For example, one side of conveyor 120 is bordered by longitudinal wall 1110A, and the opposite side of conveyor 120 is bordered by longitudinal wall 1110B. It should be understood that adjacent conveyors 120 will share a longitudinal wall 1110. Each longitudinal wall 1110 may be stationary with respect to the movement of conveyors 120. For example, each longitudinal wall 1110 may be fixed to a base of conveyor system 100, such that longitudinal wall 1110 does not move with the movement of conveyors 120.

Each longitudinal wall 1110 may have a gap 1115 where the longitudinal wall 1110 intersects chute 140. For example, longitudinal wall 1110A has a gap 1115A, and longitudinal wall 1110B has a gap 1115B. Each gap 1115 may have a width W that is substantially equal to the width of each segment 122. The top surface of each gap 1115 is recessed along the Z-axis from a top surface of each longitudinal wall 1110. In addition, the top surface of each gap 1115 may be flush with the top surface of each segment 122, such that items 130 can easily slide through gap 1115 from a first segment 122 of a first conveyor 120 within chute 140 to a second segment 122 of a second conveyor 120 within chute 140. It should be understood that the top surface of each segment 122 within chute 140 will be flush with the top surface of each gap 1115 within chute 140, such that an item 130 can be slid, by either pushing or pulling, across the top surfaces of segments 122 and gaps 1115, from one end of chute 140 to the other end of chute 140.

Each segment 122 may be bordered on both orthogonal sides (i.e., extending along the Y-axis) by a pair of orthogonal walls 1120. Each pair of orthogonal walls 1120 bordering a given segment 112 may be parallel to each other. It should be understood that orthogonal walls 1120 are orthogonal to longitudinal walls 1110. Unlike longitudinal walls 1110, orthogonal walls 1120 are fixed to conveyor 120, such that they move with conveyor 120.

Collectively, when a segment 122 is positioned with chute 140, the top surface of the segment 122 and the pair of orthogonal walls 1120 form a channel to guide items 130 along chute 140, through gaps 1115, across conveyors 120. Notably, the orthogonal walls 1120 of segments 122 within chute 140 align with each other, to form a parallel pair of substantially contiguous walls defining the longitudinal boundaries of chute 140 (i.e., along the Y-axis). In other words, the orthogonal walls for each of the plurality of segments 122 in each of the plurality of conveyors 120 may be spaced apart by the same distance (e.g., width W), such that the orthogonal walls 320 of all segments 122 within chute 140 align with each other to form a pair of parallel walls defining the radial boundaries of chute 140. This enables the chute mechanism to safely sweep all items 130 within chute 140, radially, to the external environment (e.g., another chute 140, a shipping container, a tote bin, etc.).

When a segment 122 is not positioned within chute 140, longitudinal walls 310A and 310B prevent an item 130 on the segment 122 from sliding orthogonally (i.e., along the Y-axis) off of the segment 122. Whether the segment 122 is positioned within chute 140 or outside chute 140, the pair of orthogonal walls 320 bordering the segment 122 prevent the item 130 from sliding longitudinally (i.e., along the X-axis) off of the segment 122 into another segment 122.

Conventional conveyor-based CSPC systems employ plastic tote bins to hold and transport items from one station to another station on one-way constant-speed conveyors. Human pickers pick items from a series of tote bins to assemble a group of items, representing an order, in another tote bin. The tote bin with the order is transported to another station for manual packaging and labeling. The management of many thousands of these tote bins, often moved on hand-pulled wagons, is very labor intensive.

In contrast, conveyor systems 100 creates virtual tote bins by adding circumferential walls 310 and radial walls 320 to segments 122 on conveyors 120, to thereby confine items 130 within their respective segments 122. However, gaps 315 are provided in circumferential walls 310, such that no walls exist in the radial direction when a segment 122 is within chute 140. This enables items 130 to be pushed out of the virtual tote bin onto another segment 122. Segments 122 within chute 140 can also be rotated out chute 140, to once again confine any items 130 held on the segments 122, with circumferential walls 310 and radial walls 320. With this principal, plastic tote bins can be eliminated entirely.

In addition, in conventional CSPC systems, items must generally be identified time after time by sensing machine-readable indicia at various stations. In contrast, in embodiments of conveyor system 100, items 130 are identified once at introduction, using PTIDs, and these PTIDs are preserved throughout stowage based on the items 130 movements within conveyor system 100. Thus, items 130 do not need to be identified over and over again.

Example embodiments include, without limitation:

Embodiment 1A: A conveyor system comprising: a plurality of nested conveyors, wherein each of the plurality of nested conveyors comprises a circular disk that is concentric around a central axis, wherein the circular disk comprises a plurality of segments that are each configured to hold at least one item on a top surface; a chute along at least one radial axis that is orthogonal to the central axis, wherein each of the plurality of nested conveyors is configured to rotate around the central axis, such that each of the plurality of segments in the circular disk of the nested conveyor is rotatable into the chute; a chute mechanism configured to radially move items, along the radial axis, across the top surfaces of all of the plurality of segments that are in the chute; and at least one hardware processor configured to, receive a list of one or more items stowed on the plurality of nested conveyors, for each item in the list, rotate a segment that is holding that item into the chute, and control the chute mechanism to, in a single operation, move all items that are held by segments in the chute out of the chute.

Embodiment 1B: A conveyor system comprising: a plurality of parallel linear conveyors, wherein each of the plurality of parallel linear conveyors comprises a plurality of segments along a longitudinal axis of the parallel linear conveyor, and wherein each of the plurality of segments is configured to hold at least one item on a top surface; one or more chutes along an orthogonal axis that is orthogonal to the longitudinal axis of each of the plurality of parallel linear conveyors, wherein each of the plurality of parallel linear conveyors is configured to move along the respective longitudinal axis, such that each of the plurality of segments of the parallel linear conveyor is movable into at least one of the one or more chutes; a chute mechanism configured to orthogonally move items, along the orthogonal axis, across the top surfaces of all of the plurality of segments that are in the at least one chute; and at least one hardware processor configured to, receive a list of one or more items stowed on the plurality of parallel linear conveyors, for each item in the list, move a segment that is holding that item into the chute, and control the chute mechanism to, in a single operation, move all items that are held by segments in the chute out of the chute.

Embodiment 1C: A conveyor system comprising: a plurality of conveyors, wherein each of the plurality of conveyors comprises a plurality of segments, and wherein each of the plurality of segments is configured to hold at least one item on a top surface; one or more chutes along at least one axis, wherein each of the plurality of conveyors is configured to move such that each of the plurality of segments of the conveyor is movable into at least one of the one or more chutes; a chute mechanism configured to move items, along the at least one axis, across the top surfaces of all of the plurality of segments that are in the at least one chute; and at least one hardware processor configured to, receive a list of one or more items stowed on the plurality of conveyors, for each item in the list, move a segment that is holding that item into the chute, and control the chute mechanism to, in a single operation, move all items that are held by segments in the chute out of the chute.

Embodiment 2: The conveyor system of any one of Embodiments 1A, 1B, or 1C, further comprising a stationary wall between each adjacent pair of conveyors, wherein each stationary wall comprises a gap along the radial axis or orthogonal axis.

Embodiment 3: The conveyor system of Embodiment 2, wherein each of the plurality of conveyors comprises, for each of the plurality of segments, a pair of fixed walls bounding that segment.

Embodiment 4: The conveyor system of Embodiment 3, wherein in each pair of fixed walls, the walls are parallel to each other.

Embodiment 5: The conveyor system of Embodiment 4, wherein the fixed walls for each of the plurality of segments in each of the plurality of conveyors are spaced apart by a same distance, such that the fixed walls of all segments within the chute align with each other to form a pair of parallel walls defining boundaries of the chute.

Embodiment 6: The conveyor system of Embodiment 2, wherein each of the plurality of segments of each of the plurality of conveyors has a same width, and wherein each gap has the same width.

Embodiment 7: The conveyor system of any preceding Embodiment, wherein the at least one hardware processor is further configured to: receive a list of one or more items held on the plurality of segments that are in the chute; identify a location at which to stow each of the one or more items held on the plurality of segment that are in the chute; and move a segment that is holding one of the one or more items, held on the plurality of segments that are in the chute, out of the chute to the identified location for that one item.

Embodiment: 8: The conveyor system of any preceding Embodiment, wherein the at least one hardware processor is further configured to independently control each of the plurality of conveyors to move independently from each other.

Embodiment 9: The conveyor system of Embodiment 8, wherein each of the plurality of conveyors is configured to move in two directions.

Embodiment 10: The conveyor system of Embodiment 9, wherein the at least one hardware processor is further configured to determine in which of the two directions to move each of the plurality of conveyors so as to minimize movement.

Embodiment 11: The conveyor system of any preceding Embodiment, wherein the top surface of each of the plurality of segments in each of the plurality of conveyors is textured.

Embodiment 12: The conveyor system of any preceding Embodiment, wherein the at least one hardware processor is further configured to maintain, in each of the plurality of conveyors, at least one empty segment that is movable into the chute, such that the at least one hardware processor can always clear the chute by moving the at least one empty segment in all of the plurality of conveyors into the chute.

Embodiment 13: The conveyor system of any preceding Embodiment that incorporates Embodiment 1A or 1C, further comprising a central component that is encircled by the plurality of conveyors, wherein the central component comprises a central segment that is configured to hold at least one item on a top surface, and wherein the chute extends across an entire diameter of the plurality of conveyors and includes the central segment.

Embodiment 14: A coordinated system comprising at least one level that includes a plurality of the conveyor system of any preceding Embodiment, arranged side-by-side, such that the top surface of each of the plurality of segments in each of the plurality of conveyor systems is in a same plane.

Embodiment 15: The coordinated system of Embodiment 14, wherein the at least one level comprises a plurality of levels arranged along an axis that is orthogonal to the plane.

Embodiment 16: The coordinated system of Embodiment 14 or 15, wherein the chute in each of the plurality of conveyor systems is aligned with the chute in at least one adjacent one of the plurality of conveyor systems to form a composite chute that extends across two or more of the plurality of conveyor systems in the at least one level.

Embodiment 17: The coordinated system of Embodiment 16, incorporating Embodiment 1A or 1C and Embodiment 13, wherein the central component in each of the plurality of conveyor systems is configured to rotate, and wherein the at least one hardware processor in each of the plurality of conveyor systems is configured to rotate the central component in that conveyor system to thereby change a direction of the chute in that conveyor system.

Embodiment 18: An enclosure that encloses the coordinated system of any one of Embodiments 14 through 17, wherein the composite chute extends across all of the plurality of conveyor systems in the at least one level, and wherein the enclosure comprises a port at one end of the composite chute.

Embodiment 19: The enclosure of Embodiment 18, wherein the enclosure is a portion of a delivery vehicle.

Embodiment 20: A method comprising using at least one hardware processor, within a conveyor system of any preceding Embodiment, to: receive a list of one or more items stowed on the plurality of conveyors; for each item in the list, move a segment that is holding that item into the chute; and control the chute mechanism to, in a single operation, move all items that are held by segments in the chute out of the chute.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A conveyor system comprising:

a plurality of nested conveyors, wherein each of the plurality of nested conveyors comprises a circular disk that is concentric around a central axis, wherein the circular disk comprises a plurality of segments that are each configured to hold at least one item on a top surface;

a stationary circumferential wall between each adjacent pair of the plurality of nested conveyors, wherein each circumferential wall comprises a gap along the radial axis;

a chute along at least one radial axis that is orthogonal to the central axis, wherein each of the plurality of nested conveyors is configured to rotate around the central axis, such that each of the plurality of segments in the circular disk of each of the plurality of nested conveyors is rotatable into the chute;

a chute mechanism configured to radially move items, along the radial axis, across the top surfaces of all of the plurality of segments that are in the chute; and at least one hardware processor configured to, receive a list of one or more items stowed on the plurality of nested conveyors, for each of the one or more items in the list, rotate a segment that is holding that item into the chute, and control the chute mechanism to, in a single operation, move all items that are held by segments in the chute out of the chute.

2. The conveyor system of claim 1, wherein each of the plurality of segments of each of the plurality of nested conveyors has a same width, and wherein each gap has the same width.

3. The conveyor system of claim 1, wherein the at least one hardware processor is further configured to:

receive a list of one or more items held on the plurality of segments that are in the chute;

identify a location at which to stow each of the one or more items held on the plurality of segments that are in the chute; and rotate a segment that is holding one of the one or more items, held on the plurality of segments that are in the chute, out of the chute to the identified location for that one item.

4. The conveyor system of claim 1, wherein the at least one hardware processor is further configured to maintain, in each of the plurality of nested conveyors, at least one empty segment that is rotatable into the chute, such that the at least one hardware processor can always clear the chute by rotating the at least one empty segment in all of the plurality of nested conveyors into the chute.

5. The conveyor system of claim 1, wherein each of the plurality of nested conveyors comprises, for each of the plurality of segments in the circular disk of the nested conveyor, a pair of fixed radial walls bounding that segment.

6. The conveyor system of claim 5, wherein in each pair of fixed radial walls, the radial walls are parallel to each other.

7. The conveyor system of claim 6, wherein the radial walls for each of the plurality of segments in each of the plurality of nested conveyors are spaced apart by a same distance, such that the radial walls of all segments within the chute align with each other to form a pair of parallel walls defining radial boundaries of the chute.

8. The conveyor system of claim 1, wherein the at least one hardware processor is further configured to independently control each of the plurality of nested conveyors to rotate independently from each other.

9. The conveyor system of claim 8, wherein each of the plurality of nested conveyors is configured to rotate in two directions.

10. The conveyor system of claim 9, wherein the at least one hardware processor is further configured to determine in which of the two directions to rotate each of the plurality of nested conveyors so as to minimize movement.

11. The conveyor system of claim 1, further comprising a central component that is encircled by the plurality of nested conveyors, wherein the central component comprises a central segment that is configured to hold at least one item on a top surface, and wherein the chute extends across an entire diameter of the plurality of nested conveyors and includes the central segment.

12. A coordinated system comprising at least one level that includes a plurality of the conveyor system of claim 11, arranged side-by-side, such that the top surface of each of the plurality of segments in each of the plurality of conveyor systems is in a same plane.

13. The coordinated system of claim 12, wherein the at least one level comprises a plurality of levels arranged along an axis that is orthogonal to the plane.

14. The coordinated system of claim 12, wherein the chute in each of the plurality of conveyor systems is aligned with the chute in at least one adjacent one of the plurality of conveyor systems to form a composite chute that extends across two or more of the plurality of conveyor systems in the at least one level.

15. The coordinated system of claim 14, wherein the central component in each of the plurality of conveyor systems is configured to rotate, and wherein the at least one hardware processor in each of the plurality of conveyor systems is configured to rotate the central component in that conveyor system to thereby change a direction of the chute in that conveyor system.

16. An enclosure that encloses the coordinated system of claim 14, wherein the composite chute extends across all of the plurality of conveyor systems in the at least one level, and wherein the enclosure comprises a port at one end of the composite chute.

17. The enclosure of claim 16, wherein the enclosure is a portion of a delivery vehicle.

18. A conveyor system comprising:

a plurality of nested conveyors, wherein each of the plurality of nested conveyors comprises a circular disk that is concentric around a central axis, wherein the circular disk comprises a plurality of segments that are each configured to hold at least one item on a top surface, wherein the top surface of each of the plurality of segments in each of the plurality of nested conveyors is textured;

a chute along at least one radial axis that is orthogonal to the central axis, wherein each of the plurality of nested conveyors is configured to rotate around the central axis, such that each of the plurality of segments in the circular disk of each of the plurality of nested conveyors is rotatable into the chute;

a chute mechanism configured to radially move items, along the radial axis, across the top surfaces of all of the plurality of segments that are in the chute; and at least one hardware processor configured to, receive a list of one or more items stowed on the plurality of nested conveyors, for each item in the list, rotate a segment that is holding that item into the chute, and control the chute mechanism to, in a single operation, move all items that are held by segments in the chute out of the chute.

19. The conveyor system of claim 18, further comprising a stationary circumferential wall between each adjacent pair of the plurality of nested conveyors, wherein each circumferential wall comprises a gap along the radial axis.

20. A method comprising using at least one hardware processor, within a conveyor system that comprises a plurality of nested conveyors, each of the plurality of nested conveyors comprising a circular disk that is concentric around a central axis, the circular disk comprising a plurality of segments that are each configured to hold at least one item on a top surface, a stationary circumferential wall between each adjacent pair of the plurality of nested conveyors, wherein each circumferential wall comprises a gap along the radial axis, a chute along at least one radial axis that is orthogonal to the central axis, each of the plurality of nested conveyors configured to rotate around the central axis, such that each of the plurality of segments in the circular disk of each of the plurality of nested conveyors is rotatable into the chute, and a chute mechanism configured to radially move items, along the radial axis, across the top surfaces of all of the plurality of segments that are in the chute, to:

receive a list of one or more of the items stowed on the plurality of nested conveyors;

for each of the one or more items in the list, rotate a segment that is holding that item into the chute; and control the chute mechanism to, in a single operation, move all items that are held by segments in the chute out of the chute.

21. A conveyor system comprising:

a plurality of parallel linear conveyors, wherein each of the plurality of parallel linear conveyors comprises a plurality of segments along a longitudinal axis of that parallel linear conveyor, and wherein each of the plurality of segments is configured to hold at least one item on a top surface;

one or more chutes along an orthogonal axis that is orthogonal to the longitudinal axis of each of the plurality of parallel linear conveyors, wherein each of the plurality of parallel linear conveyors is configured to move along the respective longitudinal axis, such that each of the plurality of segments of the parallel linear conveyor is movable into at least one of the one or more chutes;

a stationary circumferential wall between each adjacent pair of the plurality of parallel linear conveyors, wherein each circumferential wall comprises a gap along the orthogonal axis of each of the one or more chutes;

a chute mechanism configured to orthogonally move items, along the orthogonal axis, across the top surfaces of all of the plurality of segments that are in the at least one chute; and at least one hardware processor configured to, receive a list of one or more items stowed on the plurality of parallel linear conveyors, for each of the one or more items in the list, move a segment that is holding that item into the chute, and control the chute mechanism to, in a single operation, move all items that are held by segments in the chute out of the chute.

\* \* \* \* \*